(12) United States Patent
Miyamoto et al.

(10) Patent No.: US 8,568,232 B2
(45) Date of Patent: Oct. 29, 2013

(54) STORAGE MEDIUM HAVING GAME PROGRAM STORED THEREON AND GAME APPARATUS

(75) Inventors: Takeshi Miyamoto, Kyoto (JP); Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2167 days.

(21) Appl. No.: 11/522,357

(22) Filed: Sep. 18, 2006

(65) Prior Publication Data

US 2007/0265085 A1 Nov. 15, 2007

(30) Foreign Application Priority Data

Apr. 25, 2006 (JP) ................................. 2006-120927

(51) Int. Cl.
*A63F 13/00* (2006.01)
(52) U.S. Cl.
USPC .................................. 463/37; 463/3; 463/36
(58) Field of Classification Search
USPC ................................................ 463/3, 36–37
See application file for complete search history.

(56) References Cited

U.S. PATENT DOCUMENTS

| | | | |
|---|---|---|---|
| 5,611,731 A * | 3/1997 | Bouton et al. | 463/37 |
| 6,120,374 A * | 9/2000 | Akada et al. | 463/3 |
| 6,244,956 B1 | 6/2001 | Nakayama et al. | |
| 6,545,661 B1 * | 4/2003 | Goschy et al. | 345/158 |
| 6,634,947 B1 * | 10/2003 | Miyamoto et al. | 463/36 |
| 7,103,499 B2 * | 9/2006 | Goodwin et al. | 702/152 |
| 7,145,551 B1 * | 12/2006 | Bathiche et al. | 345/158 |
| 7,170,508 B2 * | 1/2007 | Ohno et al. | 345/419 |
| 2002/0115043 A1 * | 8/2002 | Baker et al. | 434/30 |
| 2005/0076161 A1 * | 4/2005 | Albanna et al. | 710/15 |
| 2005/0078086 A1 * | 4/2005 | Grams et al. | 345/158 |

FOREIGN PATENT DOCUMENTS

| | | |
|---|---|---|
| JP | 2000-296268 | 10/2000 |
| JP | 2000-308756 | 11/2000 |
| JP | 2001-38045 | 2/2001 |
| JP | 2002-210240 | 7/2002 |

* cited by examiner

*Primary Examiner* — Dmitry Suhol
*Assistant Examiner* — Ryan Hsu
(74) *Attorney, Agent, or Firm* — Nixon & Vanderhye P.C.

(57) ABSTRACT

Acceleration data which is output from an acceleration sensor included in an input device is obtained, and a support position coordinate set, in a virtual game space, of a support provided on an object is calculated based on the obtained acceleration data. An inclination of the input device in the real space is calculated based on the obtained acceleration data. A parameter representing an object inclination at which the object is inclined in the virtual game space is calculated in accordance with the calculated inclination of the input device. Using the support position coordinate set and the parameter representing the object inclination, the object is located in the virtual game space and displayed on a display device.

16 Claims, 20 Drawing Sheets

F I G. 3
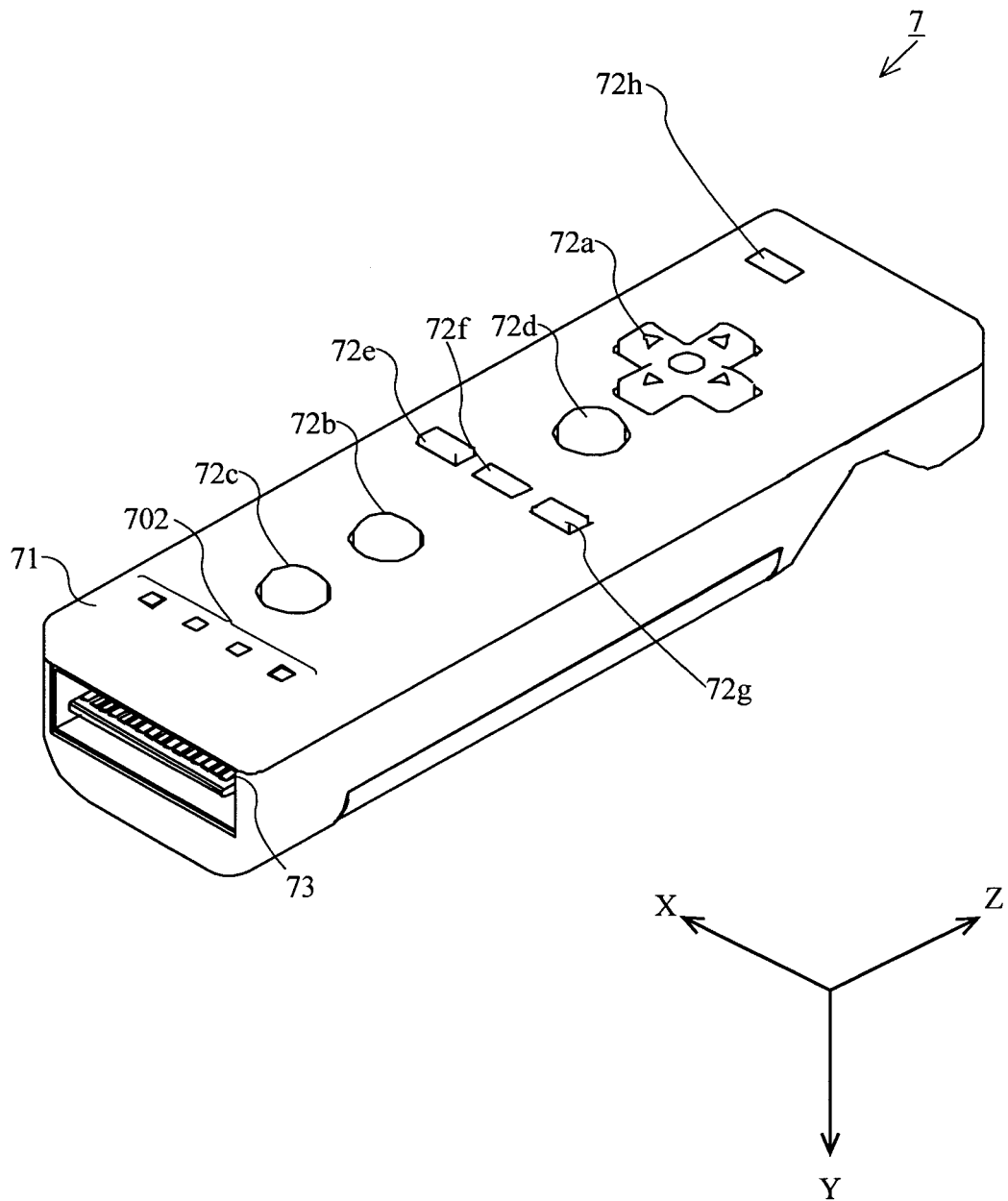

F I G. 6
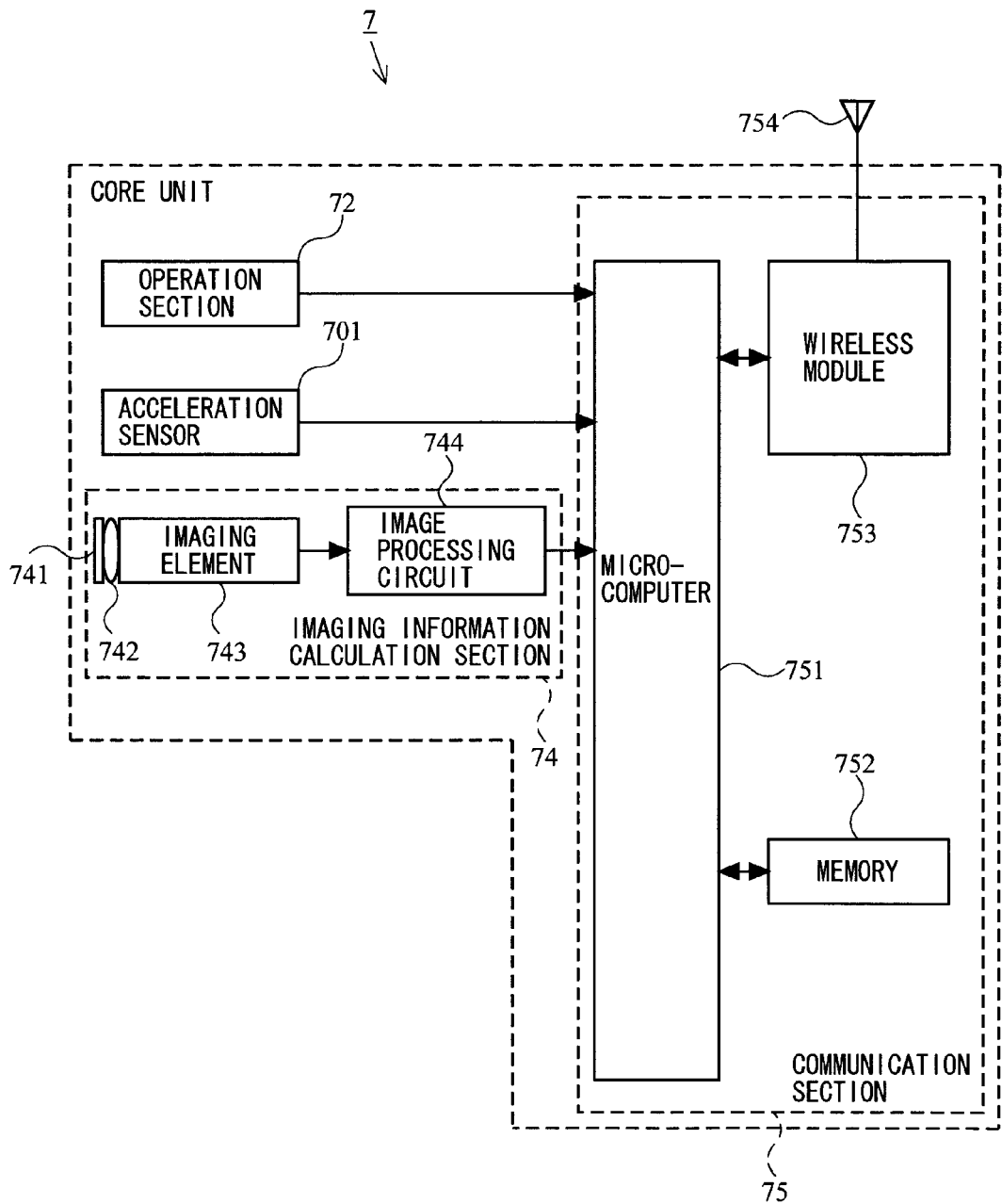

F I G. 1 3
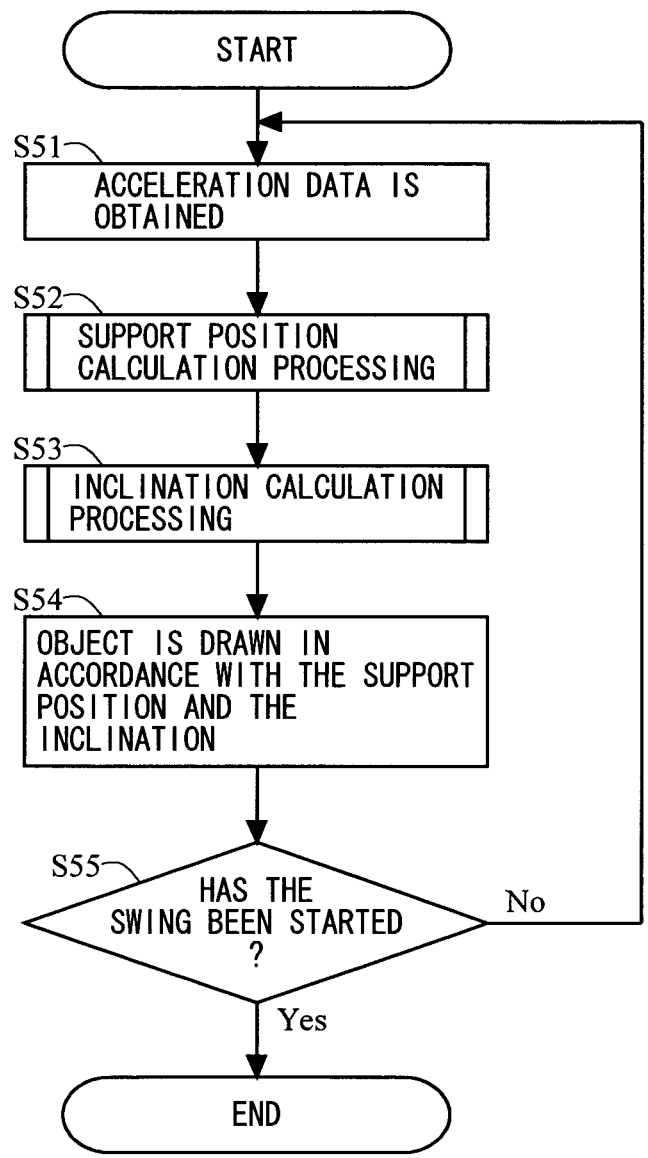

F I G. 1 6
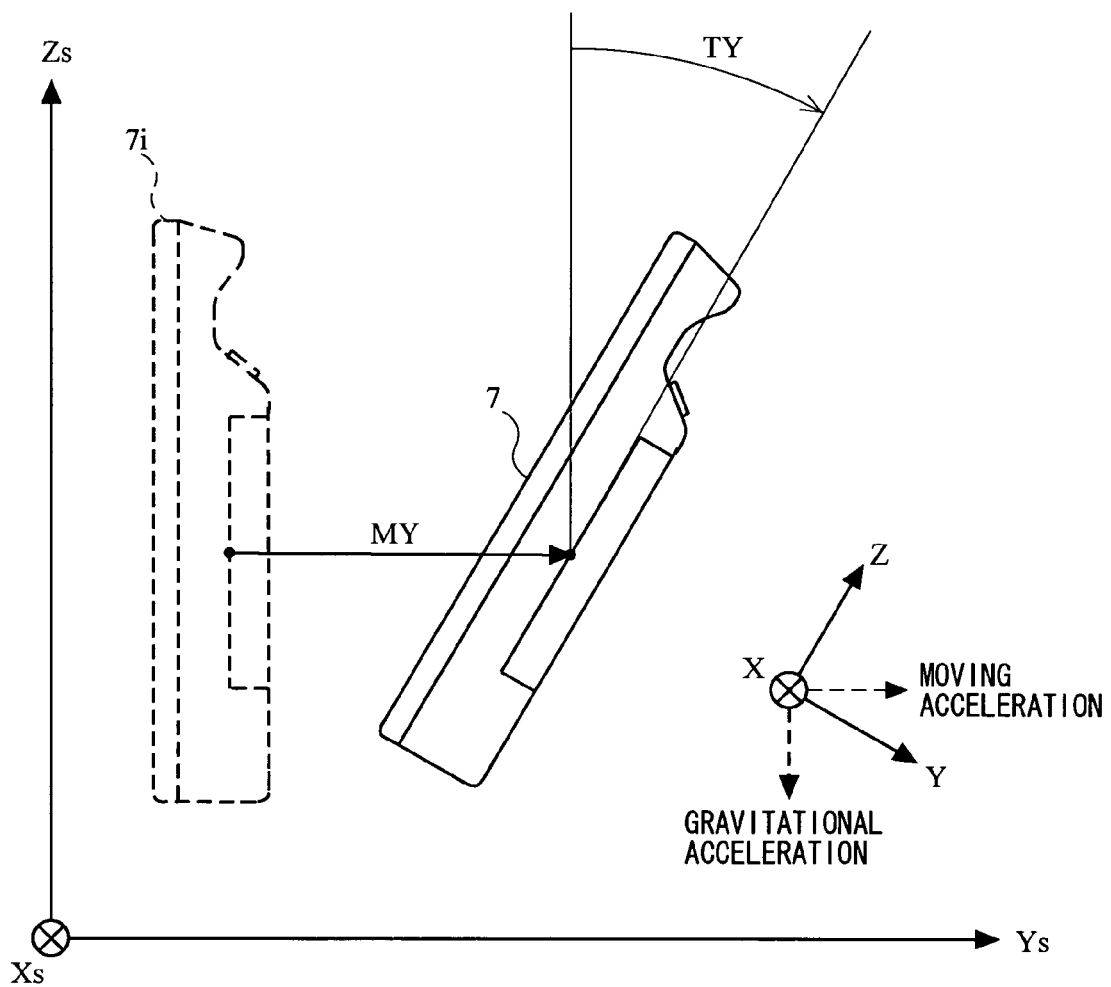

F I G. 1 8
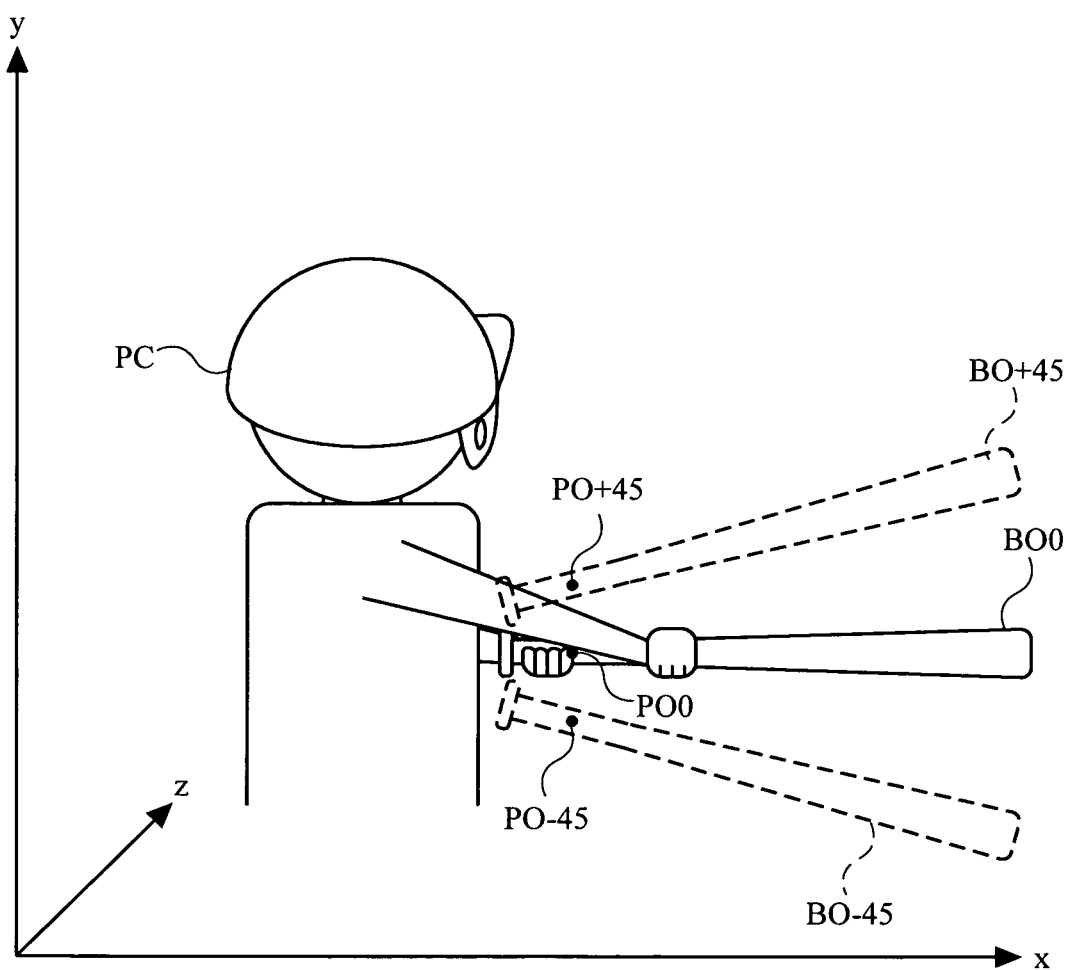

STORAGE MEDIUM HAVING GAME PROGRAM STORED THEREON AND GAME APPARATUS

CROSS REFERENCE TO RELATED APPLICATION

The disclosure of Japanese Patent Application No. 2006-120927 filed on Apr. 25, 2006 is incorporated herein by reference.

BACKGROUND OF THE INVENTION

1. Field of the Invention

The present invention relates to a storage medium having a game program stored thereon and a game apparatus, and more specifically to a storage medium having a game program for drawing an object in accordance with an inclination of an input device including an acceleration sensor, and a game apparatus.

2. Description of the Background Art

Conventionally, apparatuses have been developed for allowing a user to operate an input device including an acceleration sensor and to perform a game operation using an output from the acceleration sensor. For example, Japanese Application No. 2000-308756 (hereinafter, referred to as "patent document 1") discloses a game apparatus including a rod-like game controller having a multi-axis acceleration sensor and allowing the user to enjoy a game using an output from the acceleration sensor.

The rod-like controller disclosed in patent document 1 includes a multi-axis sensor A1 or a multi-axis gyrosensor A2. A game apparatus A10 creates data on a swinging motion of a sword (for example, data representing the strength or the movement in the forward/rearward, leftward/rightward or upward/downward direction of the swing) based on an output from the multi-axis acceleration sensor A1. Based on an output from the gyrosensor A2, the game apparatus A10 creates data on a posture of the sword swung (twisted) and a posture of the sword inclined in forward/rearward or leftward/rightward direction. Then, based on such data, the game apparatus A10 outputs data representing the motion of an object (sword) in the game to a game screen of a monitor A20.

The game apparatus disclosed in patent document 1 uses an output from the acceleration sensor and an output from the gyrosensor to move the object in the game. This requires the controller to include an acceleration sensor and a gyrosensor, which raises the cost for the controller. In addition, both the output from the acceleration sensor and the output from the gyrosensor need to be processed by the game apparatus. This complicates the processing and increases the load imposed on the game apparatus.

SUMMARY OF THE INVENTION

Disclosed herein is a storage medium having a game program for, when an input operation is made using an input device including an acceleration sensor, drawing an object in accordance with an inclination of the input device, and a game apparatus.

The reference numerals, step numbers and the like in parentheses in this section of the specification indicate the correspondence with the embodiment described later for easier understanding of the present invention, and do not limit the present invention in any way.

A first aspect of an embodiment of the present invention is directed to a storage medium having stored thereon a game program executable by a computer (30) of a game apparatus (3) for moving an object (BO) located in a virtual game space and displaying the object on a display device (2), using an acceleration detected by an input device (7) including an acceleration sensor (701) for detecting an acceleration in at least one axial direction. The game program causes the computer to execute an acceleration obtaining step (S51), a support position calculation step (S52, S76), an input device inclination calculation step (S71), an object inclination calculation step (S75, S77), and a display control step (S54). The acceleration obtaining step obtains acceleration data (Da) which is output from the acceleration sensor. The support position calculation step calculates a support position coordinate set (Dc) which represents a position, in the virtual game space, of a support (PO) provided on the object, based on the acceleration data obtained in the acceleration obtaining step. The input device inclination calculation step calculates an inclination (Dd) of the input device in a real space, based on the acceleration data obtained in the acceleration obtaining step. The object inclination calculation step calculates a parameter (Dg) representing an object inclination at which the object is inclined in the virtual game space, in accordance with the inclination of the input device calculated in the input device inclination calculation step. The display control step locates the object in the virtual game space and displays the object on the display device, using the support position coordinate set calculated in the support position calculation step and the parameter representing the object inclination calculated in the object inclination calculation step.

In a second aspect based on the first aspect, the computer is caused to further execute an inclination target setting step (S73). The inclination target setting step sets an inclination target (De) for the object in the virtual game space, in accordance with the inclination of the input device. In the object inclination calculation step, an inclination obtained by inclining the object from the current object inclination toward the inclination target by a predetermined ratio (10%) in the virtual game space is calculated, as the parameter representing the object inclination.

In a third aspect based on the first aspect, the parameter representing the object inclination is a directional vector representing a direction of the object inclination in the virtual game space. In the display control step, the object is located in the virtual game space and displayed on the display device, using the support position coordinate set and the directional vector.

In a fourth aspect based on the first aspect, the parameter representing the object inclination is a position coordinate set representing a position, in the virtual game space, of a point on the object which is different from the support. In the display control step, the object is located in the virtual game space and displayed on the display device, using the support position coordinate set and the position coordinate set of the point (PA) on the object which is different from the support.

In a fifth aspect based on the first aspect, the computer is caused to further execute a movable range setting step (FIG. 10, FIG. 11). The movable range setting step sets a movable range in which the support of the object is movable in the virtual game space.

In a sixth aspect based on the fifth aspect, in the support position calculation step, the support position coordinate set is calculated by scaling the acceleration represented by the acceleration data, obtained in the acceleration obtaining step, to the movable range, in the state where a maximum acceleration (2 G) detectable by the acceleration sensor is associated with starting and termination ends of the movable range.

In a seventh aspect based on the sixth aspect, the acceleration sensor detects an acceleration in each of three axial directions (X-, Y- and Z-axis directions) perpendicular to one another which are defined for the input device. In the movable range setting step, the movable range is set as a plane in the virtual game space. In the support position calculation step, the support position coordinate set is calculated by scaling an acceleration in a first axial direction (X-axis direction) included in the three axial directions to a first direction (z-axis direction) in the movable range, and scaling an acceleration in a second axial direction (Y-axis direction) included in the three axial directions to a second direction (y-axis direction) in the movable range perpendicular to the first direction.

In an eighth aspect based on the second aspect, the acceleration sensor detects an acceleration in each of three axial directions perpendicular to one another which are defined for the input device. In the inclination target setting step, the inclination target is set by converting an inclination of a longer axis direction of the input device with respect to a vertical direction in the real space into an inclination of a longer axis direction of the object with respect to a vertical direction in the virtual game space.

A ninth aspect of an embodiment of the present invention is directed to a game apparatus for moving an object located in a virtual game space and displaying the object on a display device, using an acceleration detected by an input device including an acceleration sensor for detecting an acceleration in at least one axial direction. The game apparatus comprises acceleration obtaining means, support position calculation means, input device inclination calculation means, object inclination calculation means, and display control means. The acceleration obtaining means obtains acceleration data which is output from the acceleration sensor. The support position calculation means calculates a support position coordinate set which represents a position, in the virtual game space, of a support provided on the object, based on the acceleration data obtained by the acceleration obtaining means. The input device inclination calculation means calculates an inclination of the input device in a real space, based on the acceleration data obtained by the acceleration obtaining means. The object inclination calculation means calculates a parameter representing an object inclination at which the object is inclined in the virtual game space, in accordance with the inclination of the input device calculated by the input device inclination calculation means. The display control means locates the object in the virtual game space and displays the object on the display device, using the support position coordinate set calculated by the support position calculation means and the parameter representing the object inclination calculated by the object inclination calculation means.

In a tenth aspect based on the ninth aspect, the game apparatus further comprises inclination target setting means. The inclination target setting means sets an inclination target for the object in the virtual game space, in accordance with the inclination of the input device. The object inclination calculation means calculates an inclination obtained by inclining the object from the current object inclination toward the inclination target by a predetermined ratio in the virtual game space, as the parameter representing the object inclination.

In an eleventh aspect based on the ninth aspect, the parameter representing the object inclination is a directional vector representing a direction of the object inclination in the virtual game space. The display control means locates the object in the virtual game space and displays the object on the display device, using the support position coordinate set and the directional vector.

In a twelfth aspect based on the ninth aspect, the parameter representing the object inclination is a position coordinate set representing a position, in the virtual game space, of a point on the object which is different from the support. The display control means locates the object in the virtual game space and displays the object on the display device, using the support position coordinate set and the position coordinate set of the point on the object which is different from the support.

In a thirteenth aspect based on the ninth aspect, the game apparatus further comprises movable range setting means. The movable range setting means sets a movable range in which the support of the object is movable in the virtual game space.

In a fourteenth aspect based on the thirteenth aspect, the support position calculation means calculates the support position coordinate set by scaling the acceleration represented by the acceleration data, obtained by the acceleration obtaining means, to the movable range, in the state where a maximum acceleration detectable by the acceleration sensor is associated with starting and termination ends of the movable range.

In a fifteenth aspect based on the fourteenth aspect, the acceleration sensor detects an acceleration in each of three axial directions perpendicular to one another which are defined for the input device. The movable range setting means sets the movable range as a plane in the virtual game space. The support position calculation means calculates the support position coordinate set by scaling an acceleration in a first axial direction included in the three axial directions to a first direction in the movable range, and scaling an acceleration in a second axial direction included in the three axial directions to a second direction in the movable range perpendicular to the first direction.

In a sixteenth aspect based on the tenth aspect, the acceleration sensor detects an acceleration in each of three axial directions perpendicular to one another which are defined for the input device. The inclination target setting means sets the inclination target by converting an inclination of a longer axis direction of the input device with respect to a vertical direction in the real space into an inclination of a longer axis direction of the object with respect to a vertical direction in the virtual game space.

According to the first aspect, when an input operation is made using an input device including an acceleration sensor, an object can be drawn using only an output from the acceleration sensor.

According to the second aspect, when an input operation is made using an input device including an acceleration sensor, one end of the object (support position) is moved in immediate response to a motion (e.g., an inclination) of the input device, whereas the other end of the object is moved so as to gradually follow the motion of the one end in the real space. For example, when an object such as an elongate member is drawn as being moved at one end thereof, the one end is immediately moved whereas the other end is moved in a delayed manner so as to gradually follow the motion of the one end. Thus, a realistic representation as if the elongate member was moved in the real space can be provided.

According to the third aspect, the inclination direction of the object can be easily controlled by using a directional vector which represents the direction of the object in the virtual game space.

According to the fourth aspect, the inclination direction of the object can be easily controlled by using position coordinate sets, in the virtual game space, of two points provided on the object.

According to the fifth aspect, a movable range for the support is limited. Therefore, even when an excessive acceleration is detected, the object is prevented from moving by an unnaturally long distance in the virtual game space.

According to the sixth aspect, the acceleration obtained from the acceleration data is directly reflected on a movable width in the virtual game space. Therefore, the coordinate set conversion is made easy.

According to the seventh aspect, the support is moved in the state where the two axial directions in the virtual game space are associated with the two axial directions in which the acceleration detects the acceleration. Therefore, the support can be moved to a position in the virtual game space, which is obtained as a result of conversion from the post-movement position of the input device in the real space.

According to the eighth aspect, an operation of inclining a longer axis of the object toward an inclination target in the virtual game space, which is obtained as a result of direct conversion from the direction represented by the longer axis of the input device, is realized.

A game apparatus according to one or more embodiments of the present invention provides substantially the same effects as those of the storage medium having the above-described game program stored thereon.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an isometric view of a controller 7 shown in FIG. 1 seen from the top rear side thereof;

FIG. 6 is a block diagram illustrating a structure of the controller 7 shown in FIG. 3;

FIG. 13 is a flowchart illustrating a flow of game processing executed by the game apparatus 3;

FIG. 16 shows an example of the controller 7 inclined from the upright state;

FIG. 18 shows an example of the bat object BO shifted in position and inclination in a bunt mode;

DESCRIPTION OF THE PREFERRED EMBODIMENTS

Figure 1:
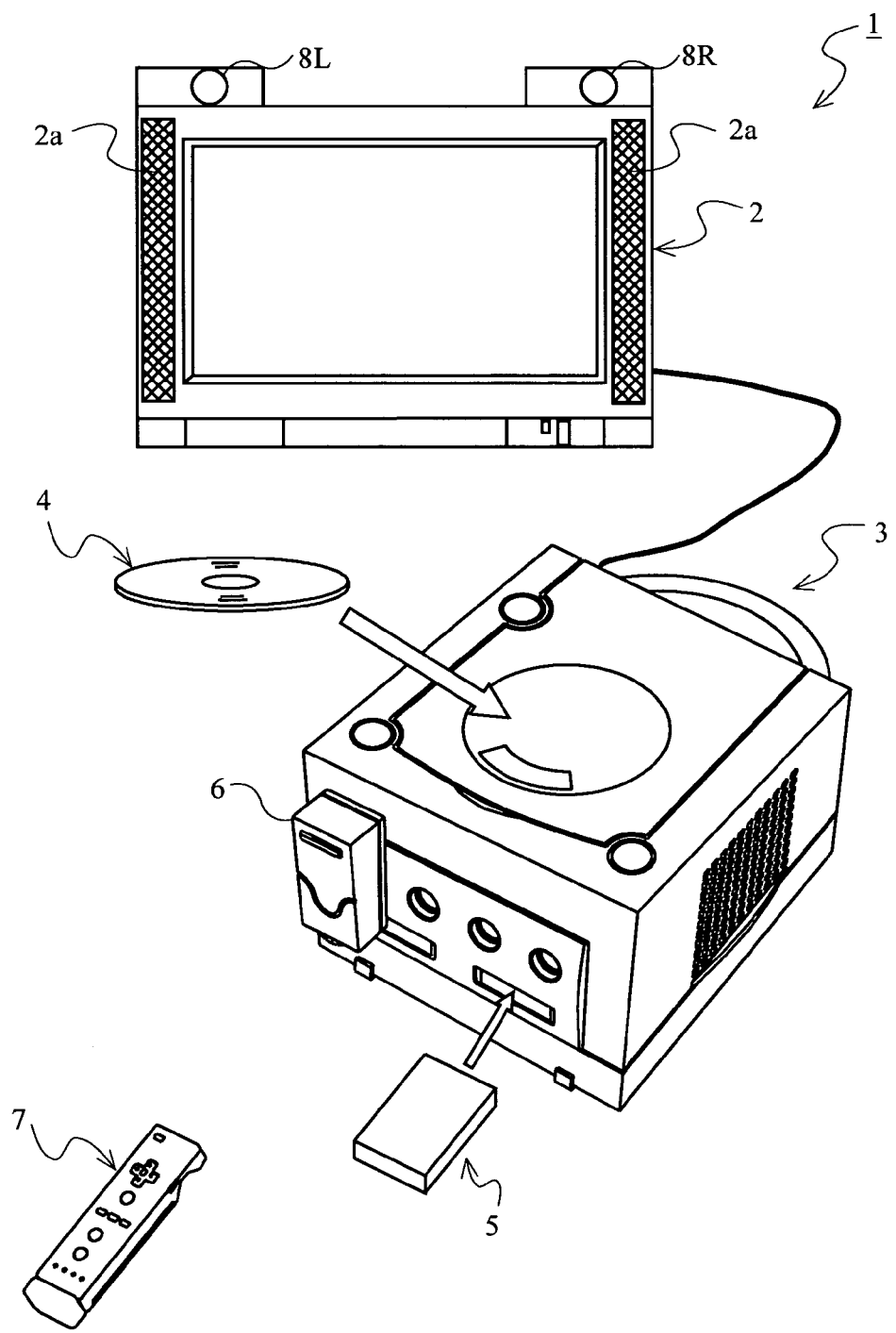
FIG. 1 is an external view of a game system 1 according to an embodiment of the present invention.

With reference to FIG. 1, a game apparatus according to one embodiment of the present invention will be described. Hereinafter, in order to give a specific description, a game system 1 using a game apparatus according to the present invention will be used as an example. FIG. 1 is an external view illustrating the game system 1. In the following description, the game system 1 is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker 2a via a connection cord, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 includes a power ON/OFF switch, a game processing reset switch, and an OPEN switch for opening a top lid of the game apparatus 3 on a top main surface of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. A player playing with the game apparatus 3 can enjoy the game by operating the controller 7 while watching the game image displayed on the monitor 2.

The controller 7 wirelessly transmits the transmission data from a communication section 75 included therein (described later) to the game apparatus 3 connected to the receiving unit 6, using the technology of, for example, Bluetooth (registered trademark). The controller 7 is operation means for mainly operating a player object appearing in a game space displayed on 5 the monitor 2. The controller 7 includes an operation section having a plurality of operation buttons, a key, a stick and the like. As described later in detail, the controller 7 also includes an imaging information calculation section 74 for taking an image viewed from the controller 7. As an example of an imaging subject of the imaging information calculation section 74, two LED modules (hereinafter, referred to as "markers") 8L and 8R are provided in the vicinity of a display screen of the monitor 2. The markers 8L and 8R each output infrared light forward from the monitor 2. In this embodiment, imaging information by the imaging information calculation section 74 is not used, and therefore the markers 8L and 8R are not absolutely necessary.

Figure 2:
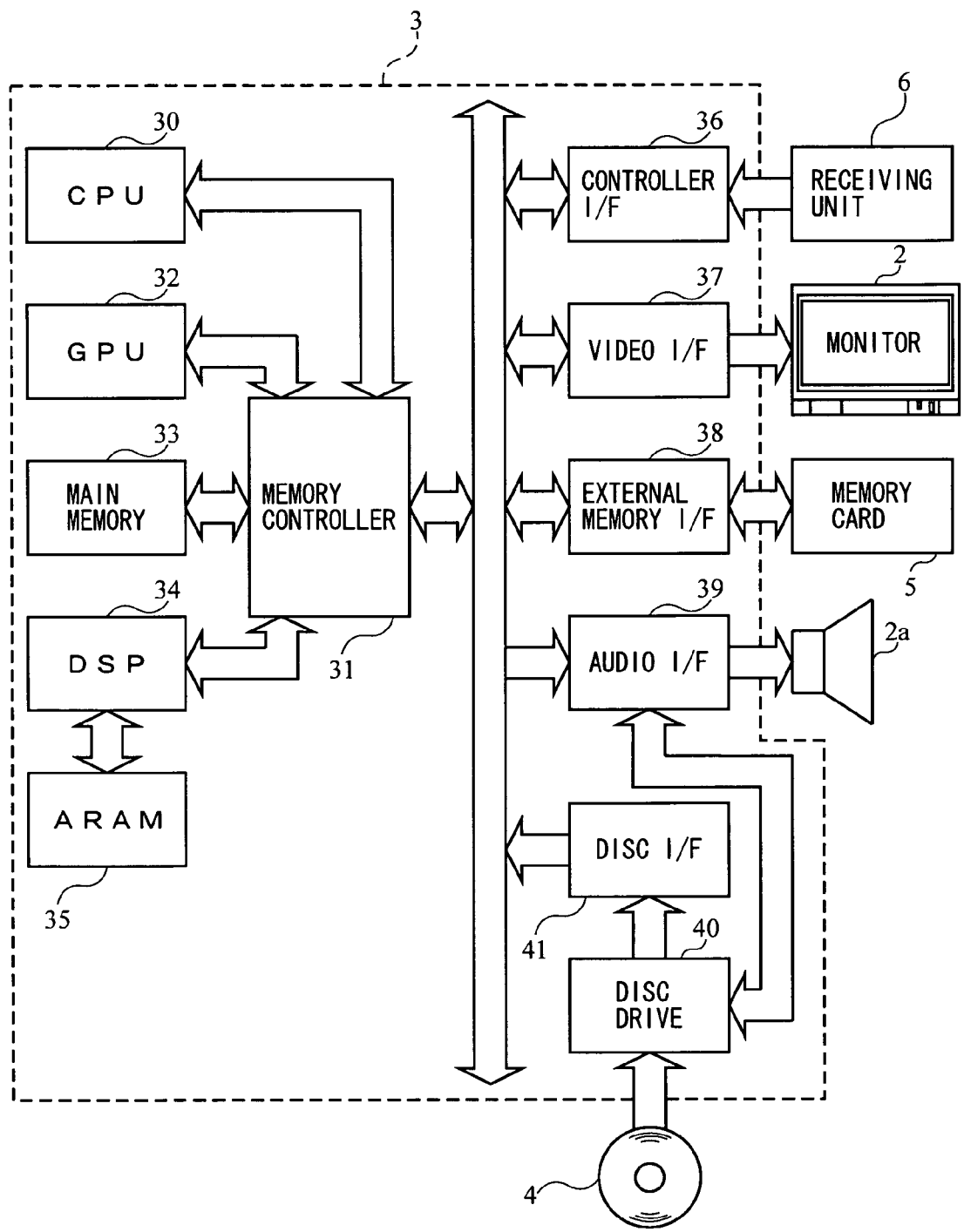
FIG. 2 is a functional block diagram of a game apparatus 3 shown in FIG. 1.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a start program stored in a boot ROM (not shown) to, for example, initialize memories including a main memory 33, and then executes a game program stored on the optical disc 4 to perform game processing or the like in accordance with the game program. The game program according to the present invention may be stored on the optical disc 4. The CPU 30 is connected to a GPU (Graphics Processing Unit) 32, the main memory 33, a DSP (Digital Signal Processor) 34, and an ARAM (Audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to the receiving unit 6, the monitor 2, the external memory card 5, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data or the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (for example, storage of the game program or sound data already read). The DSP 34 reads the sound data stored in the ARAM 35 and outputs the sound data to the speaker 2a included in the monitor 2 via the memory controller 31 and the audio I/F 39.

The memory controller 31 comprehensively controls data transfer, and is connected to the various I/Fs described above. The controller I/F 36 includes, for example, four controller I/Fs 36a through 36d, and communicably connects the game apparatus 3 to an external device which is engageable via connectors of the controller I/Fs 36a through 36d. For example, the receiving unit 6 is engaged with such a connector and is connected to the game apparatus 3 via the controller I/F 36. As described above, the receiving unit 6 receives the transmission data from the controller 7 and outputs the transmission data to the CPU 30 via the controller I/F 36. The video I/F 37 is connected to the monitor 2. The external memory I/F 38 is connected to the external memory card 5 and is accessible to a backup memory or the like provided in the external card 5. The audio I/F 39 is connected to the speaker 2a built in the monitor 2, and is connected such that the sound data read by the DSP 34 from the ARAM 35 or sound data directly output from the disc drive 40 is output from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 4:
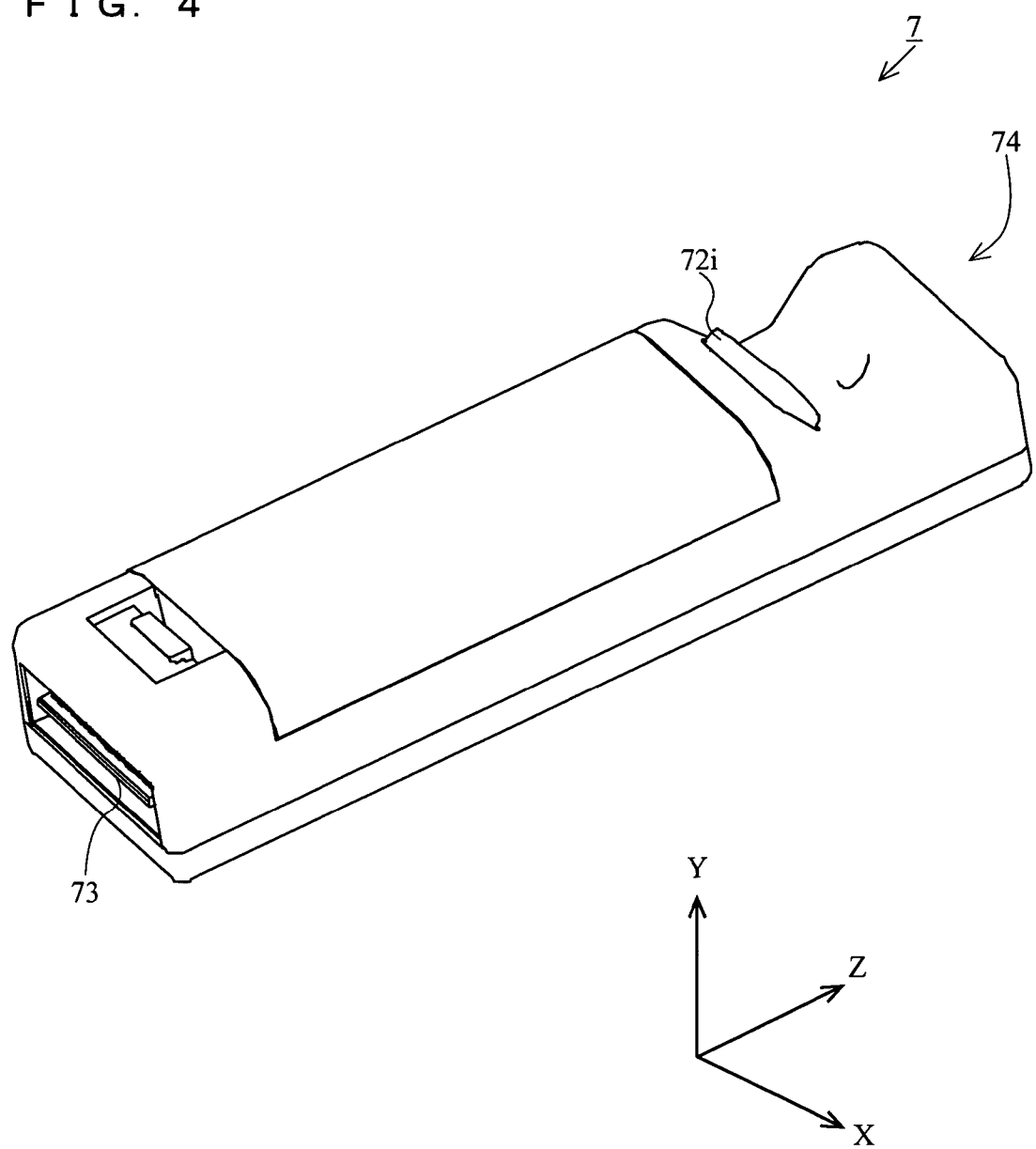
FIG. 4 is an isometric view of the controller 7 shown in FIG. 3 seen from the bottom rear side thereof.

With reference to FIG. 3 and FIG. 4, the controller 7 as an example of the input device according to the present invention will be described. FIG. 3 is an isometric view of the controller 7 seen from the top rear side thereof. FIG. 4 is an isometric view of the controller 7 seen from the bottom rear side thereof.

As shown in FIG. 3 and FIG. 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions represented by the arrows (front, rear, right and left), which are respectively located on cross-shaped projecting portions arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

The cross key 72a is an operation section for outputting an operation signal in accordance with the above-described direction input operation performed by the player, but such an operation section may be provided in another form. For example, the cross key 72a may be replaced with a composite switch including a push switch including ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the cross key 72a may be replaced with an operation section which includes switches representing at least four directions (front, rear, right and left) and outputs an operation signal in accordance with the switch pressed by the player.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of an X button, a Y button and an A button. The operation buttons 72e through 72g are assigned functions of a select switch, a menu switch and a start switch, for example. The operation buttons 72b through 72g are assigned various functions in accordance with the game program executed by the game apparatus 3, but this will not be described in detail because the functions are not directly relevant to the present invention. In an exemplary arrangement shown in FIG. 3, the operation buttons 72b through 72d are arranged in a line at the center in the front-rear direction on the top surface of the housing 71. The operation buttons 72e through 72g are arranged in a line in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he/she is using. Specifically, when the controller 7 transmits the transmission data to the receiving unit 6, one of the plurality of LEDs corresponding to the controller type is lit up.

On a bottom surface of the housing 71, a recessed portion is formed. The recessed portion is formed at a position at which an index finger or middle finger of the player is located when the player holds the controller 7. On a rear slope surface of the recessed portion, an operation button 72i is provided. The operation button 72i is an operation section acting as, for example, a B button. The operation button 72i is used, for example, as a trigger switch in a shooting game, or for attracting attention of a player object to a predetermined object.

On a front surface of the housing 71, an imaging element 743 (see FIG. 5B) included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. On a rear surface of the housing 71, a connector 73 is provided. The connector 73 is, for example, a 32-pin edge connector, and is used for engaging and connecting the controller 7 with a connection cable. The present invention is not required to use information from the imaging information calculation section 74, and thus the imaging information calculation section 74 will not be described in further detail.

In order to give a specific description, a coordinate system which is set for the controller 7 will be defined. As shown in FIG. 3 and FIG. 4, X-, Y- and Z-axis directions perpendicular to one another are defined for the controller 7. Specifically, the longitudinal direction of the housing 71, i.e., the front-rear direction of the controller 7, is set as a Z-axis direction. A direction toward the front surface of the controller 7 (the surface having the imaging information calculation section 74) is set as a positive Z-axis direction. The up-to-down direction of the controller 7 is set as a Y-axis direction. A direction toward the top surface of the controller housing 71 (the surface having the operation button 72i) is set as a positive Y-axis direction. The left-right direction of the controller 7 is set as an X-axis direction. A direction toward a left surface of the housing 71 (the surface which is not shown in FIG. 3 but is shown in FIG. 4) is set as a positive X-axis direction.

Figure 5A:
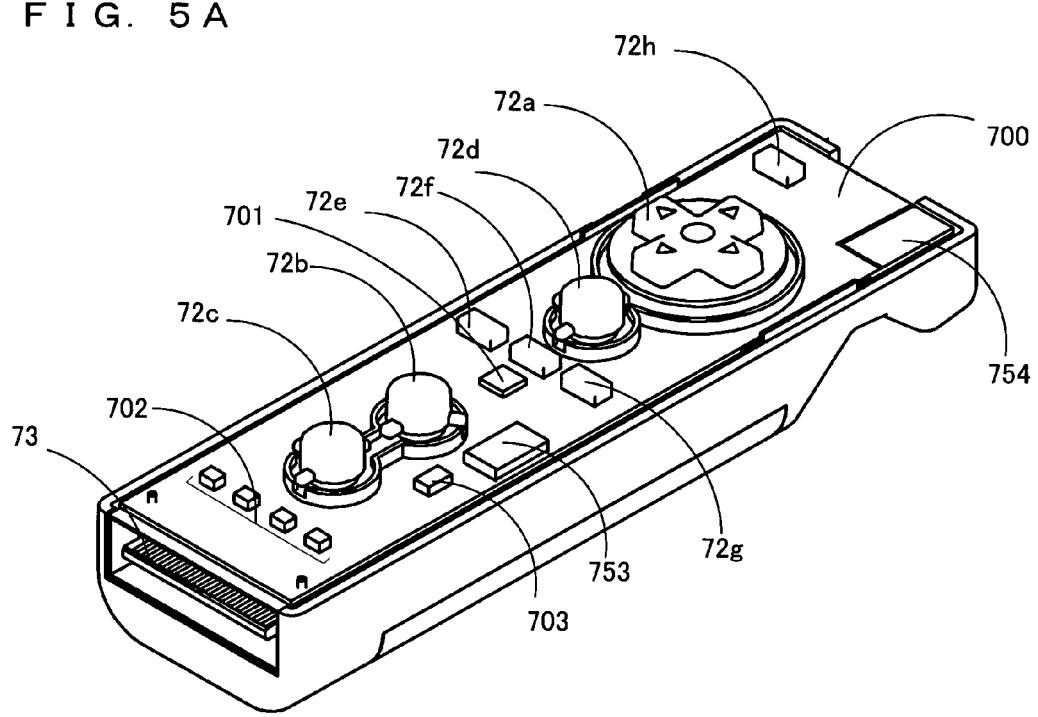
FIG. 5A is an isometric view of the controller 7 shown in FIG. 3 in the state where an upper casing is removed.
Figure 5B:
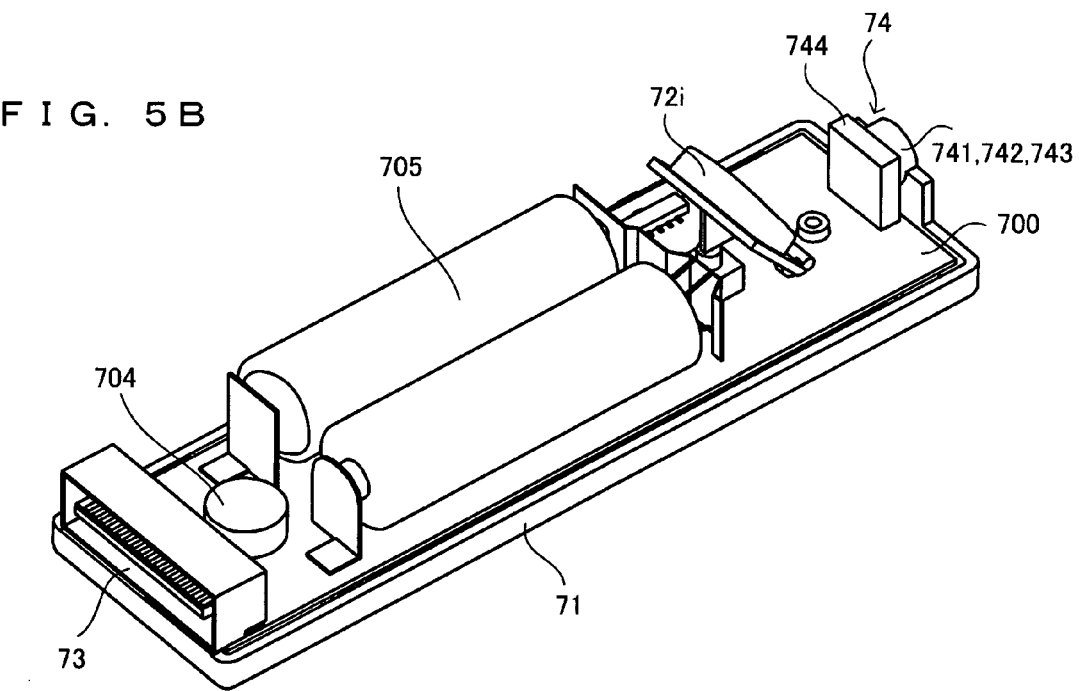
FIG. 5B is an isometric view of the controller 7 shown in FIG. 3 in the state where a lower casing is removed.

With reference to FIG. 5A and FIG. 5B, an internal structure of the controller 7 will be described. FIG. 5A is an isometric view illustrating a state where an upper casing (a part of the housing 71) of the controller 7 is removed. FIG. 5B is an isometric view illustrating a state where a lower casing (a part of the housing 71) of the controller 7 is removed. FIG. 5B shows a reverse side of a substrate 700 shown in FIG. 5A.

As shown in FIG. 5A, the substrate 700 is fixed inside the housing 71. On a top main surface of the substrate 700, the operation buttons 72a through 72h, an acceleration sensor 701, the LEDs 702, a quartz oscillator 703, a wireless module 753, an antenna 754 and the like are provided. These elements are connected to a microcomputer 751 (see FIG. 6) via lines (not shown) formed on the substrate 700 and the like. The acceleration sensor 701 detects and outputs the acceleration which is usable for calculating the inclination, vibration or the like.

In more detail, the acceleration sensor 701 included in the controller 7 as shown in FIG. 6 is preferably a three-axial acceleration sensor. The three-axial acceleration sensor 701 detects a linear acceleration in three directions, i.e., an up-down direction (Y-axis direction shown in FIG. 3), a left-right direction (X-axis direction shown in FIG. 3), and a front-rear direction (Z-axis direction shown in FIG. 3). In another embodiment, two-axial acceleration detection means for detecting a linear acceleration in only X-axis and Y-axis directions (or directions along another pair of axes) may be used depending on the type of control signals used for game processing. In still another embodiment, one-axial acceleration detection means for detecting a linear acceleration in only one of X-, Y-, and Z-axis directions may be used depending on the type of control signals used for game processing. For example, such a three-axial, two-axial, or one-axial acceleration sensor 701 may be available from Analog Devices, Inc. or STMicroelectroincs N.V. The acceleration sensor 701 is preferably of a static capacitance coupling system based on the technology of MEMS (Micro Electro Mechanical Systems) provided by silicon precision processing. Alternatively, the three-axial, two-axial, or one-axial acceleration sensor 701 may be based on an existing acceleration detection technology (for example, piezoelectric system or piezoelectric resistance system) or any other appropriate technology developed in the future.

The acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of one, two or three axes thereof. Hence, the acceleration sensor 701 cannot directly detect a physical property such as, for example, a motion along a nonlinear path (for example, an arc path), rotation, revolution, angular displacement, inclination, position or posture.

Nonetheless, those skilled in the art would easily understand from the description of this specification that further information on the controller 7 can be estimated or calculated (determined) by executing additional processing on an acceleration signal which is output from the acceleration sensor 701. For example, when a static acceleration (gravitational acceleration) is detected, an inclination of the object (controller 7) with respect to the gravitational vector can be determined by performing calculations based on the inclination angle and the detected acceleration using the output from the acceleration sensor 701. By combining the acceleration sensor 701 with the microcomputer 751 (or another processor included in the game apparatus 3 such as the CPU 30) in this manner, the inclination, posture or position of the controller 7 can be determined. Similarly, when the controller 7 including the acceleration sensor 701 is dynamically accelerated by a hand of the user, various motions and/or position of the controller 7 can be calculated by processing an acceleration signal generated by the acceleration sensor 701. In another embodiment, the acceleration sensor 701 may include a built-in signal processing device, or another type of dedicated processing device, for executing desired processing on an acceleration signal which is output from the built-in acceleration detection means before the signal is output to the microcomputer 751. For example, when the acceleration sensor 701 is for detecting a static acceleration (for example, a gravitational acceleration), the built-in or dedicated processing device may convert the detected acceleration signal to a corresponding inclination angle (or another preferable parameter).

The communication section 75 including the wireless module 753 and the antenna 754 allows the controller 7 to act as a wireless controller. The quartz oscillator 703 generates a reference clock of the microcomputer 751 described later.

As shown in FIG. 5B, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. The operation button 72i is attached on the bottom main surface of the substrate 700 rearward to the image information calculation section 74, and cells 705 are accommodated rearward to the operation button 72i. On the bottom main surface of the substrate 700 between the cells 705 and the connector 73, a vibrator 704 is attached. The vibrator 704 may be, for example, a vibration motor or a solenoid. The controller 7 is vibrated by an actuation of the vibrator 704, and the vibration is conveyed to the player holding the controller 7. Thus, a so-called vibration-responsive game is realized.

With reference to FIG. 6, the internal structure of the controller 7 will be described. FIG. 6 is a block diagram showing the structure of the controller 7.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 and generates image data. The image data generated by the imaging element 743 is processed by the image processing circuit 744. Specifically, the image processing circuit 744 processes the image data obtained from the imaging element 743, detects an area thereof having a high brightness, and outputs processing result data representing the detected coordinate position and size of the area to the communication section 75. The imaging information calculation section 74 is fixed to the housing 71 of the controller 7. The imaging direction of the imaging information calculation section 74 can be changed by changing the direction of the housing 71.

As described above, the acceleration sensor 701 detects and outputs an acceleration in the form of components of three axial directions of the controller 7, i.e., the components of the up-down direction (Y-axis direction), the left-right direction (X-axis direction), and the front-rear direction (the Z-axis direction) of the controller 7. Data representing the acceleration as the components of the three axial directions detected by the acceleration sensor 701 is output to the communication section 75. Based on the acceleration data which is output from the acceleration sensor 701, an inclination or a motion of the controller 7 can be detected. As the acceleration sensor 701, a sensor for detecting an acceleration in two, or one (e.g., the Y-axis direction), of the three axial directions may be used in accordance with data required for a specific application.

The communication section 75 includes the microcomputer 751, a memory 752, the wireless module 753 and the antenna 754. The microcomputer 751 controls the wireless module 753 for transmitting the transmission data while using the memory 752 as a storage area during processing.

Data from the controller 7 including an operation signal (key data) from the operation section 72, acceleration signals in the three axial directions (X-axis, Y-axis and Z-axis direction acceleration data) from the acceleration sensor 701, and the processing result data from the imaging information calculation section 74 are output to the microcomputer 751. The microcomputer 751 temporarily stores the input data (key data, X-axis, Y-axis and Z-axis direction acceleration data, and the processing result data) in the memory 752 as the transmission data which is to be transmitted to the receiving unit 6. The wireless transmission from the communication section 75 to the receiving unit 6 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the receiving unit 6, the microcomputer 751 outputs the transmission data stored in the memory 752 as a series of operation information to the wireless module 753. The wireless module 753 uses, for example, the Bluetooth (registered trademark) technology to radiate the operation information from the antenna 754 as a carrier wave signal of a predetermined frequency. Thus, the key data from the operation section 72, the X-axis, Y-axis and Z-axis direction acceleration data from the acceleration sensor 701, and the processing result data from the imaging information calculation section 74 are transmitted from the controller 7. The receiving unit 6 of the game apparatus 3 receives the carrier wave signal, and the game apparatus 3 demodulates or decodes the carrier wave signal to obtain the series of operation information (the key data, the X-axis, Y-axis and Z-axis direction acceleration data, and the processing result data). Based on the obtained operation information and the game program, the CPU 30 of the game apparatus 3 performs the game processing. In the case where the communication section 75 is structured using the Bluetooth (registered trademark) technology, the communication section 75 can have a function of receiving transmission data which is wirelessly transmitted from other devices.

Figure 7:
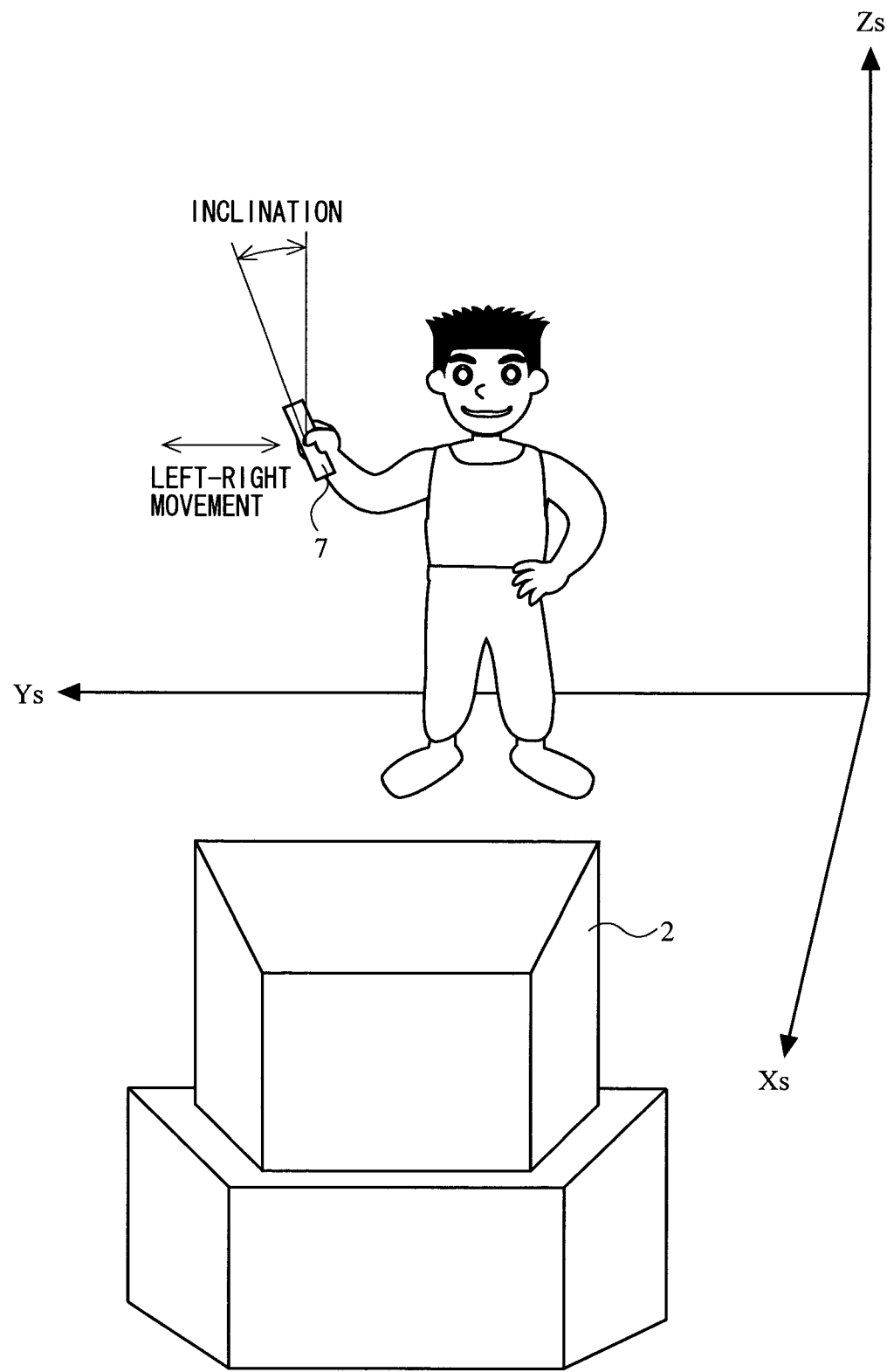
FIG. 7 shows how the controller 7 shown in FIG. 3 is used to perform a game operation.

Before describing specific processing performed by the game apparatus 3, an overview of a game played by the game apparatus 3 will be described. As shown in FIG. 7, the entire controller 7 is small enough to be held by one hand of an adult or even a child. In order to play the game with the game system 1 using the controller 7, the player holds the controller 7 with one hand or both hands as if holding a baseball bat such that the controller 7 stands upright with the top surface thereof directed toward the player (i.e., the front surface of the controller 7 is directed upward).

In order to provide a specific description, Xs, Ys and Zs axes perpendicular to one another are defined as follows for a real space in which the monitor 2 is installed and the player holding the controller 7 is existent. Specifically, the Xs axis runs in a horizontal direction connecting the player and the monitor 2, and a direction from the player toward the monitor 2 is a positive Xs-axis direction. The Ys axis runs in a horizontal direction perpendicular to the Xs axis, and a rightward direction for the player facing the display screen of the monitor 2 is a positive Ys-axis direction (in FIG. 7 showing the rear surface of the monitor 2, the leftward direction is the positive Ys axis direction). The Zs axis runs in the vertical direction in the space, and an upward direction is a positive Zs-axis direction.

Figure 8:
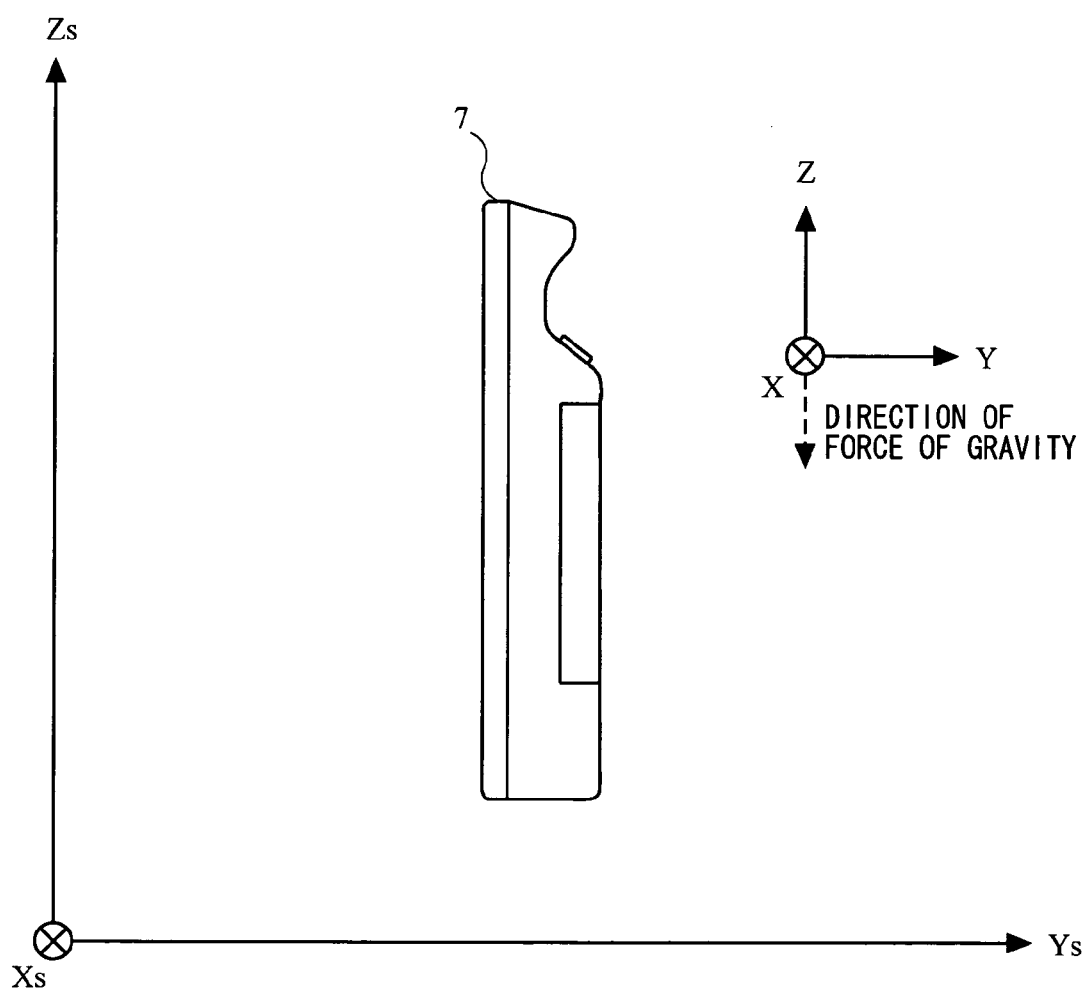
FIG. 8 shows the controller 7 in the state of standing still upright.

The player gives operation information (specifically, acceleration data in the X-, Y- and Z-axis directions) from the controller 7 to the game apparatus 3 by moving the controller 7 up, down, right or left or inclining the controller 7 from the upright state in accordance with the image displayed on the monitor 2. For example, as shown in FIG. 8, in the state where the controller 7 stands still upright with the top surface thereof being directed in the negative Ys-axis direction and the front surface thereof being directed in the positive Zs-axis direction, an acceleration in the negative Z-axis direction is applied to the controller 7 by a gravitational acceleration in the negative Zs-axis direction. FIG. 8 shows the controller 7 seen in the direction toward the monitor 2 (i.e., in the positive Xs-axis direction), and thus the directions are shown to be opposite from those in FIG. 7. When the player moves the controller 7 in the positive Ys-axis direction, an acceleration in the positive Y-axis direction is also applied to the controller 7. When the player inclines the controller 7 in the positive Ys-axis direction from the upright state, the direction of the gravitational acceleration applied to he controller 7 changes from the negative Z-axis direction to the positive Y-axis direction in accordance with the inclination angle. Such a change in the direction of acceleration applied to the controller 7 can be detected by the acceleration sensor 701. Therefore, the inclination or the movement of the controller 7 can be calculated by executing additional processing on the X-, Y- and Z-axis direction acceleration data which is output from the acceleration sensor 701. In general, when an acceleration generated in accordance with a motion is detected, an acceleration vector (or data on whether the acceleration is positive or negative) which is output from the acceleration sensor 701 is opposite to the acceleration direction applied to the controller 7. Needless to say, the inclination or the movement of the controller 7 needs to be calculated in consideration of the direction of the detected acceleration.

Figure 9:
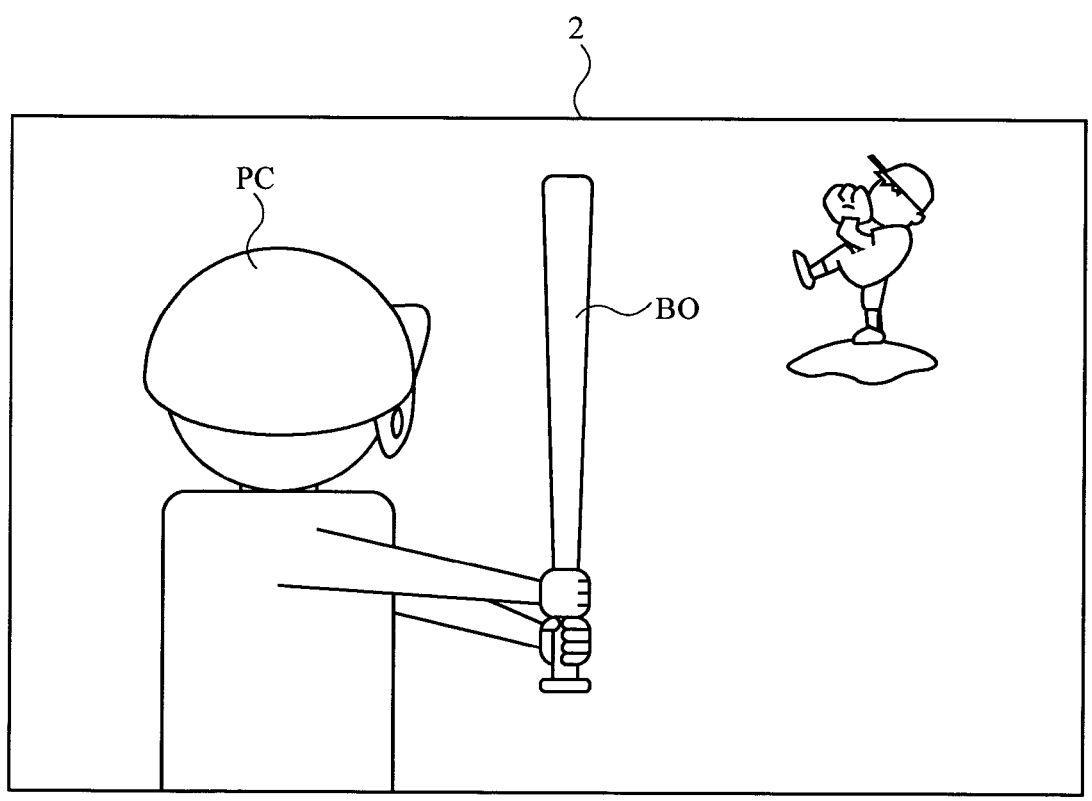
FIG. 9 shows an example of a baseball game drawn on a monitor 2 in accordance with X-, Y- and Z-axis direction acceleration data received from the controller 7.

As shown in FIG. 9, a baseball game or the like is displayed on the monitor 2 in accordance with the X-, Y-, and Z-axis direction acceleration data which is received from the controller 7. Specifically, a part of a field (for example, a baseball field) which is set in a virtual game space is displayed on the monitor 2 as a three-dimensional game image. A player character PC representing a batter operated by the player, a bat object BO held by the player character PC, an opponent character which is to play against the player character PC and the like are located in the virtual game space and displayed on the monitor 2. In order to provide a specific explanation below, it is assumed that a game program representing a baseball game is stored on the optical disc 4. Among the baseball game processing executed by the CPU 30, the processing of moving the bat object BO in the virtual game space in accordance with the inclination and the movement of the controller 7 will be specifically described.

The player character PC holds the bat object BO, and is located on the field which is set in the virtual game space. In accordance with the motion of the player inclining or moving the controller 7, the position or posture of the bat object BO is shifted and thus the manner in which the player character PC holds the bat object BO is changed. Namely, as the player holding the controller 7 performs an operation of moving the controller 7, the player character PC is displayed as performing an operation of holding the bat object BO in a similar manner. Thus, the player feels as if he/she was playing baseball while holding the controller 7 as a baseball bat.

For example, when the player moves the controller 7 rightward or leftward from the upright state, the bat object BO immediately moves in the virtual game space in accordance with such a motion of the controller 7. When the players inclines the controller 7 from the upright state, the bat object BO is inclined at a predetermined ratio in accordance with the inclination angle of the controller 7. Namely, the bat object BO immediately moves in response to the rightward or leftward movement of the controller 7, whereas gradually inclining in a delayed manner in response to the inclining motion of the controller 7. Generally in the real world, when it is attempted to move an elongate member having a certain weight at one end thereof or to change the inclination angle thereof at one end thereof, the end moves immediately but the other end moves in a delayed manner. For example, the player can quickly change the inclination angle of the controller 7. However, if the inclination angle of the bat object BO was changed similarly in response to the change in the inclination angle of the controller 7, the player character PC would appear as if it was holding a lightweight elongate member. This would appear unrealistic to the player. The inclination angle of the controller 7 is changed by a subtle motion of the hand of the player holding the controller 7. If the bat object BO reacted to this change with a high responsiveness, the motion of the bat object BO would appear unnatural even though the bat object BO is intended to be moved in compliance with the player operating the controller 7. In this embodiment, when the controller 7 is moved rightward or leftward, or inclined, one end (support position) of the bat object BO moves in immediate response to the motion of the controller 7, but the other end is moved or inclined in a delayed manner so as to gradually follow the motion of the one end. Therefore, the object representing the baseball bat can be drawn as moving or inclining naturally. Thus, a baseball game reflecting the motions applied by the player to the controller 7 can be presented.

Figure 10:
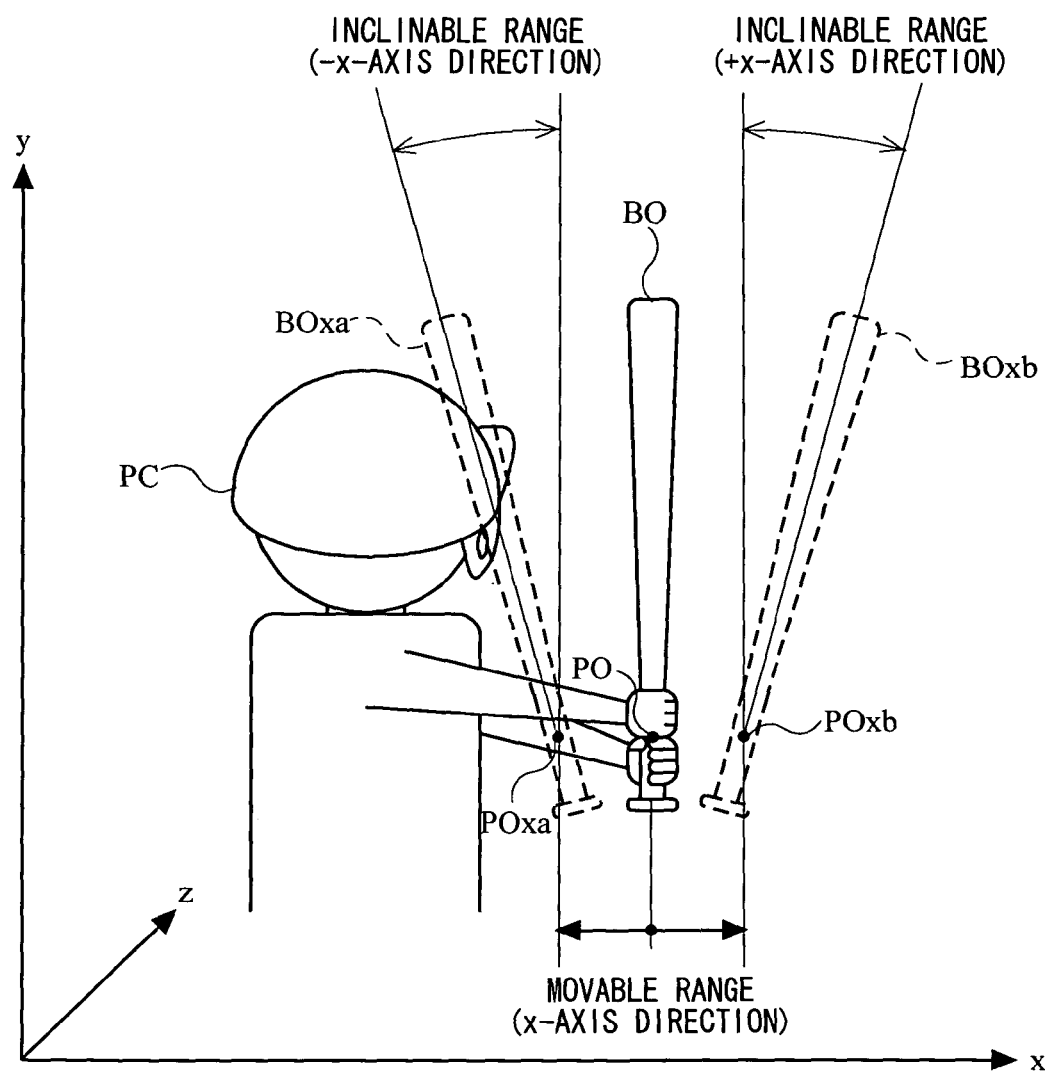
FIG. 10 shows a virtual game space in a horizontal direction to illustrate a motion of a bat object BO.
Figure 11:
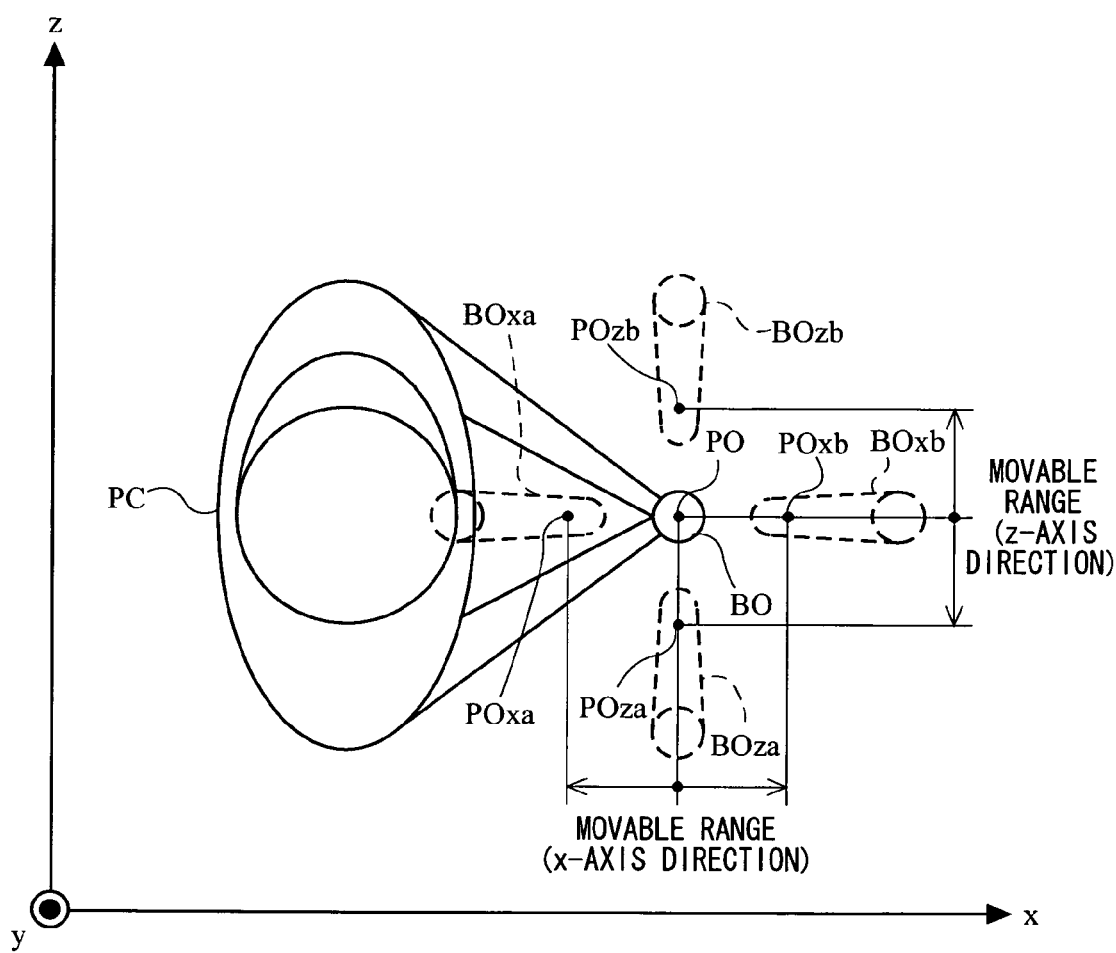
FIG. 11 shows the virtual game space in a vertical direction from above to illustrate a motion of the bat object BO.

With reference to FIG. 10 and FIG. 11, an example of a movable range and an inclinable range of the bat object BO will be described. FIG. 10 shows the virtual game space in a horizontal direction in order to illustrate a motion of the bat object BO. FIG. 11 shows the virtual game space in a vertical direction from above in order to illustrate a motion of the bat object BO.

In FIG. 10 and FIG. 11, x, y and z axes perpendicular to one another are defied in the virtual game space. The x axis runs in a left-right direction of the virtual game space displayed on the monitor 2, the y axis runs in an up-down direction thereof, and the z axis runs in a depth direction thereof. A point PO representing a position of the bat object BO is provided in a part of the bat object BO (for example, in a lower part of the bat object BO; e.g., a part at which the player character PC grips the bat object BO). The position of the bat object BO in the virtual game space is represented by a coordinate set of the point PO in an x-y-z coordinate system. The inclination of the bat object BO in the virtual game space is represented by an angle at which the bat object BO is inclined with respect to the point PO (for example, a directional vector).

A position and an inclination angle of the bat object BO, corresponding to the position and the inclination angle of the controller 7 which stands still upright with the front surface thereof being directed upward (see FIG. 8), are respectively set as the reference position and the reference inclination angle of the bat object BO. In FIG. 10 and FIG. 11, the bat object BO having the point PO at the reference position and assuming the reference inclination angle is shown by the solid line, and the bat objects BO shifted from the reference position and the reference inclination angle are shown with the dashed line. In this embodiment, the position and the inclination of the bat object BO are represented based on the state of the controller 7 standing still upright with the front surface being directed upward as described above. Thus, the reference inclination angle is the positive y-axis direction (upward direction in the virtual game space).

A movable range is provided as a range in which the point PO can move in the virtual game space. The movable range has a predetermined width in the positive and negative x-axis directions (an x-axis direction movable width wx described later), and a predetermined width in the positive and negative z-axis directions (a z-axis direction movable width wz described later), with respect to the reference position. In this embodiment, a maximum movable range of the point PO (i.e., the maximum value/minimum value of the movable range along the x axis and the z axis) is provided in correspondence with the maximum value of acceleration detectable by the acceleration sensor 701 (e.g., 2 G for each axis). The output value from the acceleration sensor 701 is scaled to the movable range, and thus the post-movement coordinate set in the x-y-z coordinate system of the point PO is calculated. For example, the width of the movable range in the x-axis and z-axis directions with respect to the reference position is set at length 3 in the virtual game space. The acceleration in the Y-axis direction detected by the acceleration sensor 701 is made to correspond to the movement of the point PO in the x-axis direction, and the acceleration in the X-axis direction detected by the acceleration sensor 701 is made to correspond to the movement of the point PO in the z-axis direction. Where the maximum value of acceleration detectable by the acceleration sensor 701 is 2 G, the detected acceleration in the Y-axis direction is multiplied by 1.5 to scale the position of the point PO in the x-axis direction to the movable range. The detected acceleration in the X-axis direction is multiplied by 1.5 to scale the position of the point PO in the z-axis direction to the movable range. In FIG. 10 and FIG. 11, in accordance with the detection of the maximum value of acceleration in the negative Y-axis direction by the acceleration sensor 701, the coordinate set of the point PO scaled to the minimum value in the x-axis direction in the movable range is represented as point POxa. In accordance with the detection of the maximum value of acceleration in the positive Y-axis direction by the acceleration sensor 701, the coordinate set of the point PO scaled to the maximum value of the acceleration in the x-axis direction in the movable range is represented as point POxb. In accordance with the detection of the maximum value of acceleration in the negative X-axis direction by the acceleration sensor 701, the coordinate set of the point PO scaled to the minimum value in the z-axis direction in the movable range is represented as point POza. In accordance with the detection of the maximum value of acceleration in the positive X-axis direction by the acceleration sensor 701, the coordinate set of the point PO scaled to the maximum value in the z-axis direction in the movable range is represented as point POzb.

An inclinable range is provided as a range in which the bat object BO can incline in the virtual game space. The inclinable range has a predetermined angle in the positive and negative x-axis directions, and a predetermined angle in the positive and negative z-axis directions, with respect to the reference inclination angle (i.e., the positive y-axis direction). The bat object BO is drawn as inclining in the x-axis direction using the acceleration in the Y-axis direction detected by the acceleration sensor 701, and is drawn as inclining in the z-axis direction using the acceleration in the X-axis direction detected by the acceleration sensor 701. As described later, the game apparatus 3 calculates a target inclination for the bat object BO within the movable range using the X-axis and Y-axis direction acceleration data, which is output from the controller 7. Then, the game apparatus 3 draws the bat object BO with the inclination angle being changed by a predetermined ratio (e.g., 10%) from the current inclination angle toward the target inclination. In FIG. 10 and FIG. 11, the bat object BO in the state of inclining at the maximum angle in the inclinable range in the negative x-axis direction is represented as bat object BOxa. The bat object BO in the state of inclining at the maximum angle in the inclinable range in the positive x-axis direction is represented as bat object BOxb. The bat object BO in the state of inclining at the maximum angle in the inclinable range in the negative z-axis direction is represented as bat object BOza. The bat object BO in the state of inclining at the maximum angle in the inclinable range in the positive z-axis direction is represented as bat object BOzb.

In this embodiment, as described later, when the controller 7 is inclined to a state closer to a horizontal state, the player character PC can bunt by holding the bat object BO in an almost horizontal state. In the case of a bunt, both one end (support position) and the other end of the bat object BO may move in immediate response to the motion of the controller 7. The reason is that a bunt is generally performed with the baseball bat being held at two points (with the baseball bat being supported at the grip or the vicinity thereof and a central position of the baseball bat or the vicinity thereof) and thus it is natural that the tip of the baseball bat immediately reacts to the motion of the controller 7. Depending on the manner in which the batter represented by the player character PC holds the baseball bat, the other end of the bat object BO may be moved in immediate response. In this way, the object representing the baseball bat can be drawn as moving naturally. Thus, a baseball game reflecting the motions applied by the player to the controller 7 can be presented.

Figure 12:
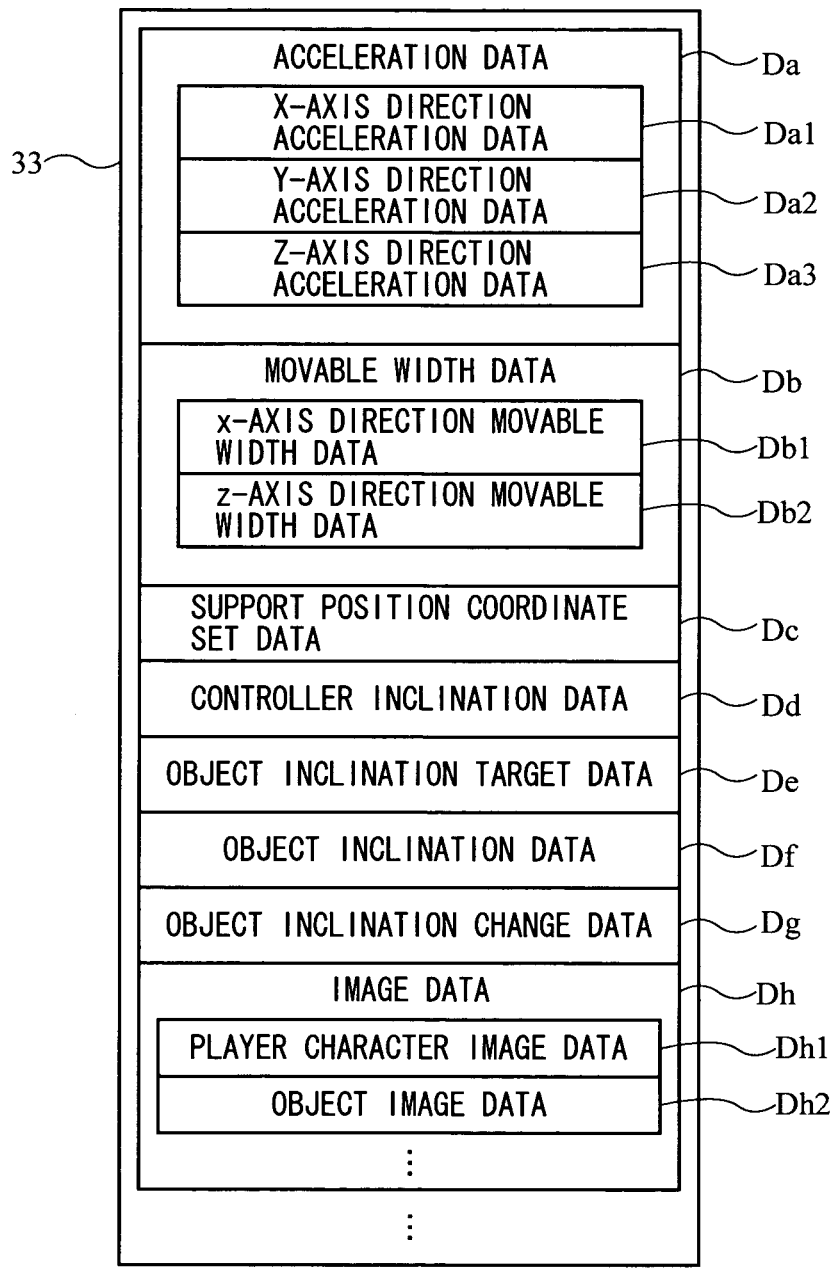
FIG. 12 shows main data stored on a main memory 33 in the game apparatus 3.

Next, the game processing executed by the game system 1 will be described in detail. With reference to FIG. 12, main data used for the game processing will be described. FIG. 12 shows main data stored on the main memory 33 of the game apparatus 3.

As shown in FIG. 12, the main memory 33 has stored thereon acceleration data Da, movable width data Db, support position coordinate set data Dc, controller inclination data Dd, object inclination target data De, object inclination data Df, object inclination change data Dg, image data Dh and the like. The main memory 33 has stored thereon data regarding the player character PC, the opponent character and the like appearing in the game (position data, etc.), data regarding the virtual game space (topographical data, etc.) and other data required for the game processing as well as the above-described data.

The acceleration data Da is included in a series of operation information transmitted from the controller 7 as transmission data. The acceleration data Da includes X-axis direction acceleration data Da1, Y-axis direction acceleration data Da2, and Z-axis direction acceleration data Da3 which are each detected by the acceleration sensor 701 as a component of each of X-, Y-, and Z-axes. The receiving unit 6 included in the game apparatus 3 receives acceleration data included in the operation information which is transmitted from the controller 7 at a predetermined interval of, for example, 5 ms, and stores the acceleration data in a buffer (not shown) in the receiving unit 6. Then, the acceleration data is read in units of a frame, which is a game processing interval, and thus the acceleration data Da in the main memory 33 is updated. In this embodiment, the acceleration data Da may be updated into the latest acceleration data transmitted from the controller 7. Alternatively, acceleration data of a predetermined number of previous frames may be stored.

The movable width data Db represents the width in which the point PO (support position; see FIG. 10 and FIG. 11) is movable in the virtual game space with respect to the reference position. The movable width data Db includes x-axis direction movable width data Db1 which represents a movable width in the x-axis direction, and z-axis direction movable width data Db2 which represents a movable width in the z-axis direction. The support position coordinate set data Dc represents the coordinate set of the point PO in the virtual game space.

The controller inclination data Dd represents the direction of inclination of the controller 7 which is calculated using the acceleration data Da. The object inclination target data De represents the inclination target for the bat object BO, in the virtual game space, with respect to the point PO. The object inclination target data De is represented by, for example, a directional vector. The object inclination data Df represents an angle at which the bat object BO is drawn as inclining with respect to the point PO in the virtual game space. The object inclination data Df is represented by, for example, a directional vector. The object inclination change data Dg represents a shift of the inclination of the bat object BO, and is represented by, for example, a shift vector representing a shift of the directional vector.

The image data Dh includes, for example, player character image data Dh1 and object image data Dh2. The image data Dh is used for locating the player character PC and the bat object BO in the virtual game space to generate a game image.

Figure 14:
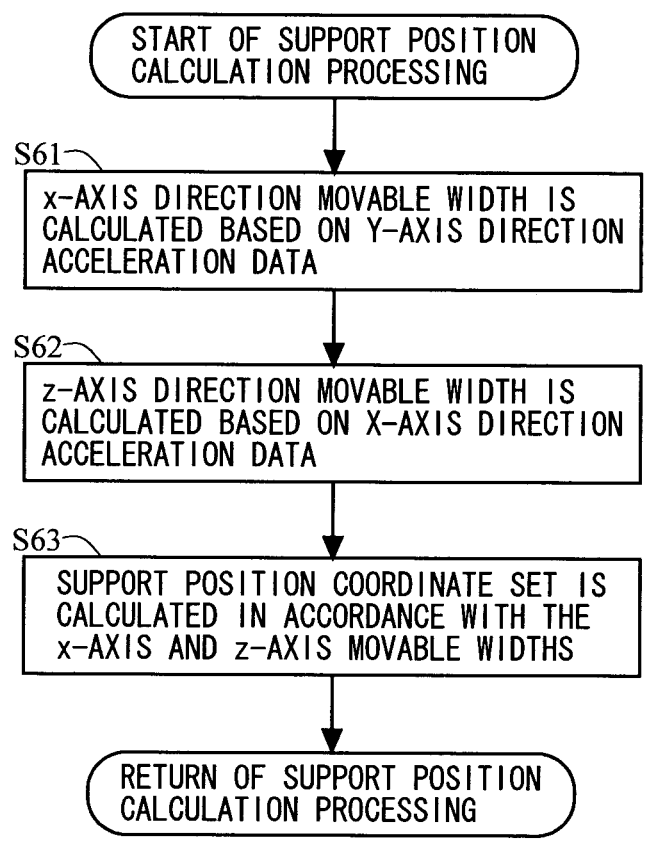
FIG. 14 is a flowchart illustrating a subroutine of support position calculation processing in step 52 shown in FIG. 3 in detail.
Figure 15:
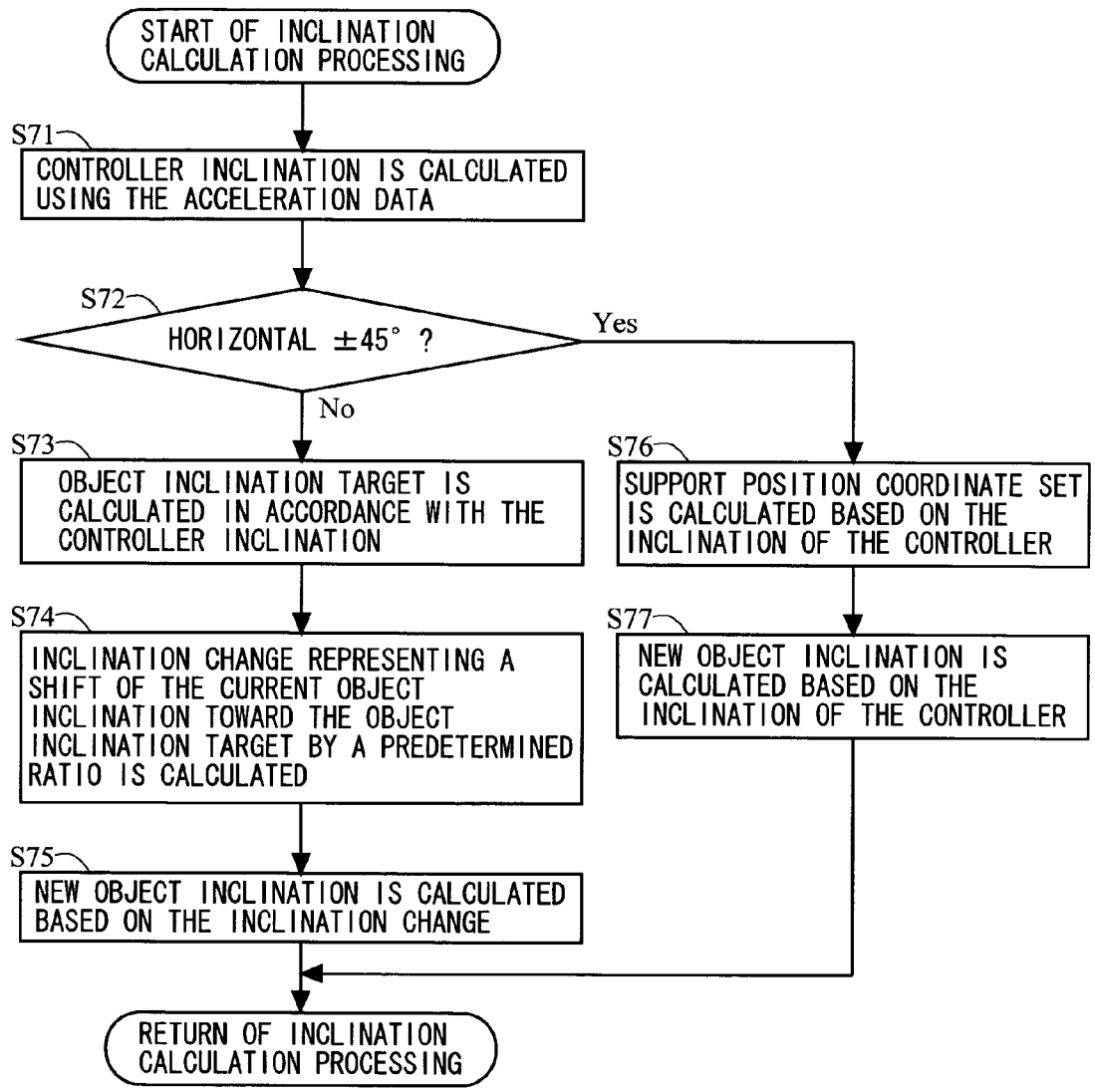
FIG. 15 is a flowchart illustrating a subroutine of inclination calculation processing in step 53 shown in FIG. 3 in detail.
Figure 17:
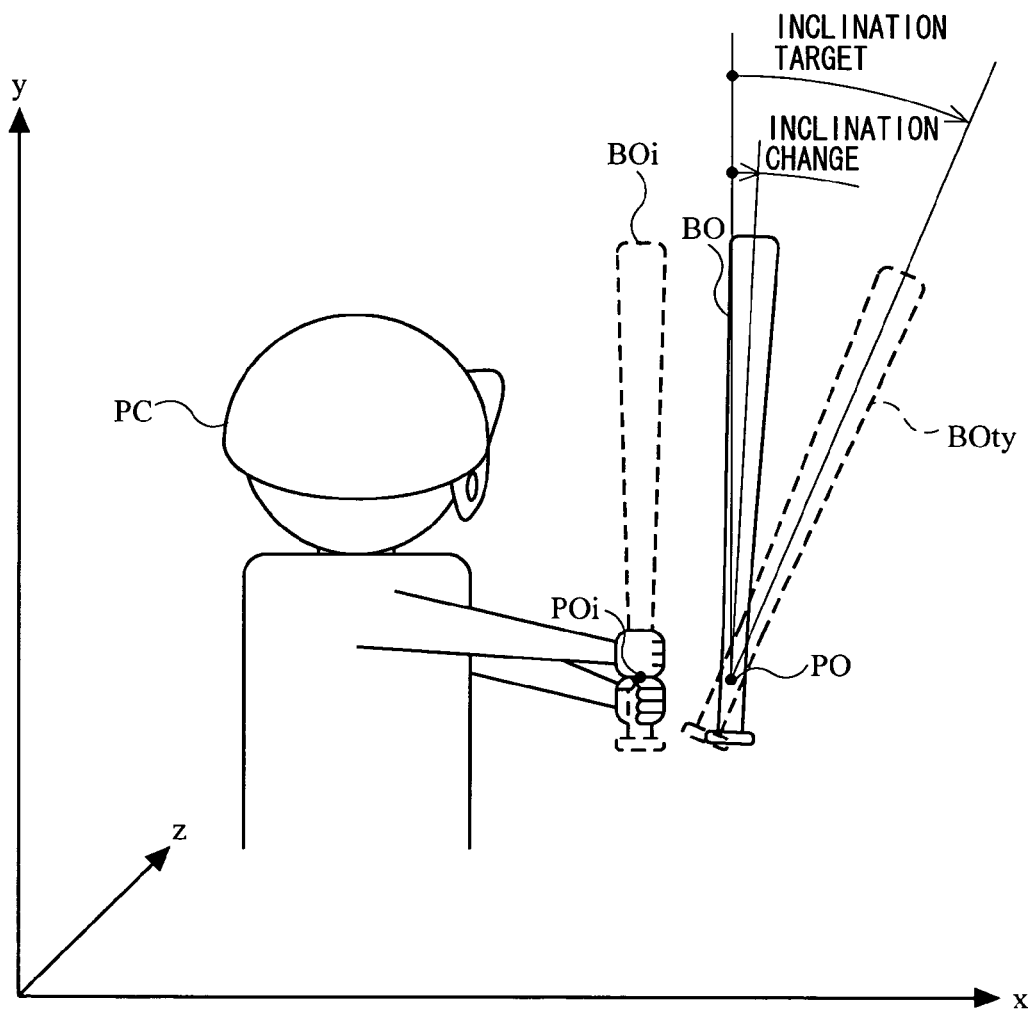
FIG. 17 shows an example of the bat object BO shifted in position and inclination.

With reference to FIG. 13 through FIG. 18, the game processing executed by the game apparatus 3 will be described in detail. FIG. 13 is a flowchart illustrating a flow of the game processing executed by the game apparatus 3. FIG. 14 is a flowchart illustrating a subroutine of support position calculation processing in step 52 shown in FIG. 13 in detail. FIG. 15 is a flowchart illustrating a subroutine of inclination calculation processing in step 53 shown in FIG. 13 in detail. FIG. 16 shows an example of the controller 7 inclining from the upright state. FIG. 17 shows an example of the bat object BO shifted in position and posture. FIG. 18 shows an example of the bat object BO shifted in position and posture in a bunt mode. The flowcharts in FIG. 13 through FIG. 15 illustrate the processing of drawing the object executed in accordance with the operation by player of moving or inclining the controller 7. The other game processing which is not directly relevant to the present invention will not be described in detail. In FIG. 13 through FIG. 15, the "steps" executed by the CPU 30 will be referred to simply as "S".

When the game apparatus 3 is turned on, the CPU 30 of the game apparatus 3 executes a start program stored in a boot ROM (not shown) to initialize the elements including the main memory 33. The game program stored on the optical disc 4 is read to the main memory 33, and thus the CPU 30 starts executing the game program. The flowcharts shown in FIG. 13 through FIG. 15 illustrate the game processing executed after the above-described processing is completed.

With reference to FIG. 13, the CPU 30 obtains acceleration data included in the operation information received from the controller 7 (step 51), and advances the processing to the next step. The CPU 30 stores the obtained acceleration data in the main memory as the acceleration data Da. The acceleration data obtained in step 51 includes X-, Y- and Z-axis direction acceleration data detected by the acceleration sensor 701 as a component of each of X-, Y-, and Z-axes. The communication section 75 transmits the operation information to the game apparatus 3 at a predetermined time interval (for example, every 5 ms), and thus at least the acceleration data is stored in the buffer (not shown) included in the receiving unit 6. The CPU 30 obtains the acceleration data stored in the buffer and stores the acceleration data in the main memory 33, in units of a frame as a game processing interval.

Next, the CPU 30 executes support position calculation processing (step 52), and advances the processing to the next step. Hereinafter, with reference to FIG. 14, the support position calculation processing in step 52 will be described.

Referring to FIG. 14, the CPU 30 calculates an x-axis direction movable width wx based on the Y-axis direction acceleration data Da2 obtained in step 51 (step 61). Then, the CPU 30 stores the calculated x-axis direction movable width wx in the main memory 33 as the x-axis direction movable width data Db1, and advances the processing to the next step. As described above, the CPU 30 sets the maximum movable range in correspondence with the maximum value of acceleration detectable by the acceleration sensor 701, and scales the acceleration data detected by the acceleration data sensor 701 to the movable range. For example, where the maximum value of acceleration detectable by the acceleration sensor 701 is 2 G and the width of the movable range in the x-axis and z-axis directions with respect to the reference position is length 3, the CPU 30 calculates the x-axis direction movable width wx by multiplying the acceleration data represented by the Y-axis direction acceleration data Da2 by 1.5.

Next, the CPU 30 calculates a z-axis direction movable width wz based on the X-axis direction acceleration data Da1 obtained in step 51 (step 62). Then, the CPU 30 stores the calculated z-axis direction movable width wz in the main memory 33 as the z-axis direction movable width data Db2, and advances the processing to the next step. For example, where the maximum value of acceleration detectable by the acceleration sensor 701 is 2 G and the width of the movable range in the x-axis and z-axis directions with respect to the reference position is length 3, the CPU 30 calculates the z-axis direction movable width wz by multiplying the acceleration data represented by the X-axis direction acceleration data Da1 by 1.5.

Next, the CPU 30 calculates a support position coordinate set in accordance with the calculated x-axis direction movable width wx and z-axis direction movable width wz (step 63). Then, the CPU 30 stores the calculated support position coordinate set in the main memory 33 as the support position coordinate set data Dc, and terminates the processing in this subroutine. For example, where the coordinate set of the reference position in the virtual game space is (x0, y0, z0), the CPU 30 sets the support position coordinate set at (x0+wz, y0, z0+wz).

With reference to FIG. 16 and FIG. 17, the relationship between the motion of the controller 7 and the support position will be described. FIG. 16 shows the controller 7 in the space in the display screen of the monitor 2 seen in the direction toward the display screen (i.e., the display screen of the monitor 2 is present beyond the controller 7; same as in FIG. 8). FIG. 17 shows the player character PC and the bat object BO displayed on the monitor 2. As is clear from comparing FIG. 16 with FIG. 17, when it is assumed that the virtual game space represented on the monitor 2 exists in the real space where the player is present, the positive Ys-axis direction of the real space, which is the rightward direction for the player facing the display screen of the monitor 2, is the same as the positive x-axis direction which is the rightward direction of the virtual game space. The positive Z-axis direction in the real space, which is the upward direction with respect to the player, is the same as the positive y-axis direction which is the upward direction in the virtual game space. The positive Xs-axis direction of the real space, which is from the player toward the monitor 2, is the same as the positive z-axis direction which is the depth direction of the virtual game space.

Now, it is assumed that the controller 7, which is in a state of standing upright with the top surface being directed in the negative Ys-axis direction and the front surface directed in the positive Zs-axis direction (controller 7i represented by the dashed line in FIG. 16), is moved by distance MY in the positive Ys-axis direction and inclined by angle TY in the positive Ys-axis direction (the controller 7 represented by the solid line in FIG. 16). With the controller 7i standing upright, the acceleration in the X-axis direction and the acceleration in the Y-axis direction are both 0, and a gravitational acceleration in the negative Z-axis direction is detected (see FIG. 8). The controller 7 detects an acceleration generated by the movement by distance MY (moving acceleration) and a change in the gravitational acceleration caused by the inclination by angle TY. Specifically, as shown in FIG. 16, the acceleration sensor 701 of the controller 7 detects a moving acceleration generated in a direction between the positive Y-axis direction and the positive Z-axis direction, and a gravitation acceleration generated in a direction between the positive Y-axis direction and the negative Z-axis direction. As a result, the acceleration sensor 701 detects an acceleration in the positive Y-axis direction as a sum of the Y-axis direction component of the moving acceleration and the Y-axis direction component of the gravitational acceleration. The acceleration detected by the acceleration sensor 701 in the X-axis direction is 0.

By the above-described operation, the support position coordinate set is scaled using the x-axis direction movable width ws calculated based on the Y-axis direction acceleration data. For example, the support position, which is at the position corresponding to the upright state, is moved in the positive x-axis direction in accordance with the acceleration in the positive Y-axis direction described above (is moved from the position of point POi to the position of the point PO in FIG. 17). Namely, when the controller 7 moves, the support position immediately moves in the same direction (in the example of FIG. 16 and FIG. 17, in the positive x-axis direction in the virtual game space, which is the same as the positive Ys-axis direction in the real space).

Returning to FIG. 13, the CPU 30 executes inclination calculation processing (step 53), and advances the processing to the next step. Hereinafter, with reference to FIG. 15, the inclination calculation processing in step 53 will be described.

Referring to FIG. 15, the CPU 30 calculates the current inclination of the controller 7 based on the acceleration data Da1 obtained in step 51 (step 71). Then, the CPU 30 stores the calculated inclination of the controller 7 in the main memory 33 as the controller inclination data Dd, and advances the processing to the next step. For example, when the acceleration sensor 701 detects a static acceleration (gravitational acceleration), the inclination of the controller 7 with respect to the gravitational vector can be calculated by performing calculations using the output from the acceleration sensor 701. When the acceleration sensor 701 also detects a dynamic acceleration (moving acceleration), it is difficult to find an accurate inclination of the controller 7. In this embodiment, the inclination of the controller 7 may be obtained by regarding the dynamic acceleration also as the static acceleration.

Next, the CPU 30 determines whether or not the inclination of the controller 7 is within the range of ±45° with respect to the horizontal direction in the real space (step 72). When the inclination of the controller 7 is outside the range of ±45° with respect to the horizontal direction, the CPU 30 advances the processing to step 73. By contrast, when the inclination of the controller 7 is within the range of ±45° with respect to the horizontal direction, the CPU 30 advances the processing to step 76.

In step 73, the CPU 30 calculates an inclination target for the bat object BO in accordance with the inclination of the controller 7 calculated in step 71 (see FIG. 17). Then, the CPU 30 stores the calculated inclination target in the main memory 33 as the object inclination target data De, and advances the processing to the next step. For example, the CPU 30 calculates a directional vector in the virtual game space, as a result of conversion from the inclination of the controller 7 in the real space, and sets the directional vector as the object inclination target.

Next, the CPU 30 calculates an inclination change representing a shift of the current object inclination toward the object inclination target by a predetermined ratio (step 74; see FIG. 17). Then, the CPU 30 stores the calculated inclination change in the main memory 33 as the object inclination change data Dg, and advances the processing to the next step. For example, the CPU 30 calculates a moving vector representing a result of the directional vector, which represents the current inclination of the bat object BO stored as the object inclination data Df, being shifted toward the directional vector, which represents the inclination target, by a predetermined ratio (e.g., 10%). Then, the CPU 30 sets the moving vector as the inclination change.

Next, the CPU 30 calculates a new object inclination based on the inclination change calculated in step 74 (step 75). Then, the CPU 30 stores the calculated object inclination in the main memory 33 as the object inclination data Df, and terminates the processing in this subroutine.

With reference to FIG. 16 and FIG. 17, the relationship between the inclination of the controller 7 and the object inclination will be described. For example, when the controller 7 is stopped still in the state of inclining by angle TY as shown in FIG. 16, the acceleration sensor 701 of the controller 7 detects a static gravitational acceleration generated in a direction between the positive Y-axis direction and the negative Z-axis direction. The CPU 30 finds that the controller 7 is inclined toward the positive Ys-axis direction by angle TY with respect to the positive Zs-axis direction (the upward direction in the real space), in accordance with the output from the acceleration sensor 701 which detected the gravitational acceleration. Next, the CPU 30 calculates an inclination target at which the bat object BO would appear inclined toward the positive x-axis direction by angle TY with respect to the positive y-axis direction. The inclination target is obtained in the virtual game space as a result of conversion from the inclination of the controller 7. Then, the CPU 30 changes the current inclination of the bat object BO (bat object BOi represented by the dashed line in FIG. 17) toward the inclination target by the predetermined ratio (resulting in the object BO represented by the solid line in FIG. 17).

In this manner, the bat object BO is drawn as inclining in the virtual game space in accordance with the inclination of the controller 7, like the support position (point PO). For example, if the bat object BO was drawn reflecting the above inclination target as it is, the bat object BO would be drawn as inclining in immediately response to the inclination of the controller 7, i.e., as bat object BOty represented by the dashed line in FIG. 17. However, in this embodiment, the bat object BO is not drawn as inclining by the same amount as the change amount of the inclination of the controller 7, but is drawn as inclining by a predetermined ratio (e.g., 10%) of the change amount of the controller 7. Namely, as the player inclines the controller 7, the bat object BO reacts in a delayed manner so as to be gradually inclined. Therefore, the baseball bat appears moving or inclining naturally. Thus, a baseball game reflecting the motions applied by the player to the controller 7 can be presented.

As described above, the inclinable range is set for the bat object BO. Therefore, it is necessary to accommodate the object inclination within the inclinable range during any of steps 73 through 75. For example, in step 73, the CPU 30 may set, as the inclination target, a direction in the inclinable range which is closest to the direction in the virtual game space, obtained as a result of conversion from the inclination of the controller 7. In step 74 or 75, the CPU 30 may calculate an inclination change or a new object inclination such that the object inclination is accommodated within the inclinable range.

Returning to FIG. 15, when the inclination of the controller 7 is within the range of ±45° with respect to the horizontal direction, the CPU 30 transfers the processing to a bunt mode and advances the processing to step 76. In step 76, the CPU 30 calculates the support position coordinate set in accordance with the inclination of the controller 7 calculated in step 71. Then, the CPU 30 stores the calculated support position coordinate set in the main memory 33 as the support position coordinate set data Dc. Next, the CPU 30 calculates a new object inclination in accordance with the inclination of the controller 7 calculated in step 71 (step 77). Then, the CPU 30 stores the calculated object inclination in the main memory 33 as the object inclination data Df, and terminates the processing in this subroutine.

In the bunt mode, the CPU 30 determines the support position and the inclination of the bat object BO in accordance with the inclination of the controller 7 with respect to the horizontal direction. For example, the support position of the point PO and the inclination of the bat object BO are preset in accordance with the inclination of the controller 7 with respect to the horizontal direction. Specifically, the CPU 30 sets the inclination of the bat object BO as a result of conversion from the inclination of the controller 7 in the real space, the conversion being performed such that the conversion result is closer to the horizontal direction in the virtual game space.

With reference to FIG. 18, the relationship between the inclination of the controller 7 and the position and inclination of the object will be described. For example, when the player places the controller 7 in the horizontal direction (0°), the CPU 30 sets the support position of the bat object BO at the position of the point PO0. Then, the CPU 30 sets the inclination of the bat object BO at the positive x-axis direction in the virtual game space (bat object BO0 represented by the solid line in FIG. 18), which is obtained as a result of conversion from the inclination of the controller 7 (horizontal).

When the player directs the front surface of the controller 7 at 45° upward with respect to the horizontal direction (+45°), the CPU 30 sets the support position of the bat object BO at a position of the point PO+45. Then, the CPU 30 sets the inclination of the bat object BO at a direction inclining toward the positive y-axis direction with respect to the positive x-axis direction at an angle smaller than 45° (bat object BO+45 represented by the dashed line in FIG. 18). Such a direction is obtained as a result of conversion from the inclination of the controller 7 in the real space (45° upward with respect to the horizontal direction), the conversion being performed such that the conversion result is closer to the horizontal direction in the virtual game space. When the player directs the front surface of the controller 7 at 45° downward with respect to the horizontal direction (−45°), the CPU 30 sets the support position of the bat object BO at a position of the point PO−45. Then, the CPU 30 sets the inclination of the bat object BO at a direction inclining toward the negative y-axis direction with respect to the positive x-axis direction at an angle smaller than 45° (bat object BO−45 represented by the dashed line in FIG. 18). Such a direction is obtained as a result of conversion from the inclination of the controller 7 in the real space (45° downward with respect to the horizontal direction), the conversion being performed such that the conversion result is closer to the horizontal direction in the virtual game space. When the inclination of the controller 7 is less than 45° upward or downward with respect to the horizontal direction, the position and inclination of the bat object BO are set between the bat object BO+45 and BO−45.

The bat object BO in the bunt mode is moved mainly in the left-right and up-down directions (i.e., the x-y planar directions) of the virtual game space. Alternatively, the bat object BO may be moved or inclined in the depth direction (z-axis direction). For example, when the player holds the controller 7 in the horizontal state and then moves the controller 7 rightward or leftward, the controller 7 may be twisted around the Z-axis direction (see FIG. 3 and FIG. 4). The twist applied to the controller 7 influences the inclination of the controller 7 calculated as described above. Therefore, even when the controller 7 is kept horizontal, the position of the controller 7 as a result of moving rightward or leftward can be calculated by extracting the twist. Using the result of this calculation, the support position of the bat object BO in the bunt mode can be moved in the z-axis direction in the virtual game space, or the bat object BO can be drawn as inclining in the z-axis direction.

The support position coordinate set of the bat object BO in the bunt mode is calculated in accordance with the inclination of the controller 7 which is calculated in step 71. Alternatively, the support position coordinate set may be calculated by scaling the acceleration detected by the acceleration sensor 701 to the movable range like in steps 61 through 63. For example, in the bunt mode, a movable range in which the support position is movable in the virtual game space is set. The movable range has a y-axis direction movable width wy in the positive and negative y-axis directions, and a z-axis direction movable width wz in the positive and negative z-axis directions, with respect to the reference position in the bunt mode (the position of the point PO0 shown in FIG. 18; the reference position coordinate set is (xb0, yb0, zb0)). Specifically, the support position corresponding to the maximum value in the positive z-axis direction in the movable range is the point PO+45 shown in FIG. 18. The support position corresponding to the minimum value in the positive z-axis direction in the movable range is the point PO−45 shown in FIG. 18. Next, the y-axis direction movable width wy is calculated based on the Z-axis direction acceleration data Da3 obtained in step 51, and the z-axis direction movable width wz is calculated based on the X-axis direction acceleration data Da1 obtained instep 51. Using the y-axis direction movable width wy and the z-axis direction movable width wz, the support position coordinate set in the bunt mode is calculated as (xb0, yb0+wy, zb0+wz). In the bunt mode also, the support position can be obtained by scaling the acceleration, represented by the acceleration data which is output by the acceleration sensor 701, to the virtual game space.

Returning to FIG. 13, the CPU 30 draws the bat object BO on the monitor 2 in accordance with the support position and the current object inclination (step 54), and advances the processing to the next step. Specifically, the CPU 30 refers to the support position coordinate set data Dc and the object inclination data Df to obtain a directional vector which represents the support position coordinate set of the bat object BO (the coordinate set of the point PO) and the inclination direction of the bat object BO. Then, the CPU 30 draws the player character PC holding the bat object BO on the display screen of the monitor 2 using the image data Dh or the like.

Next, the CPU 30 determines whether or not the player performed an operation to start a swing motion of swinging the bat (step 55). For example, the operation to start a swing motion is performed by the player swinging the controller 7 rightward or leftward. In this case, the CPU 30 can determine whether or not the player has started to swing the controller 7, based on the magnitude of the acceleration in the positive Z-axis direction which is output from the acceleration sensor 701. When the player has not performed an operation to start a swing motion, the CPU 30 returns the above-described processing to step 51 and repeats the processing. By contrast, when the player has performed an operation to start a swing motion, the CPU 30 terminates the processing in this flowchart.

Figure 19A:
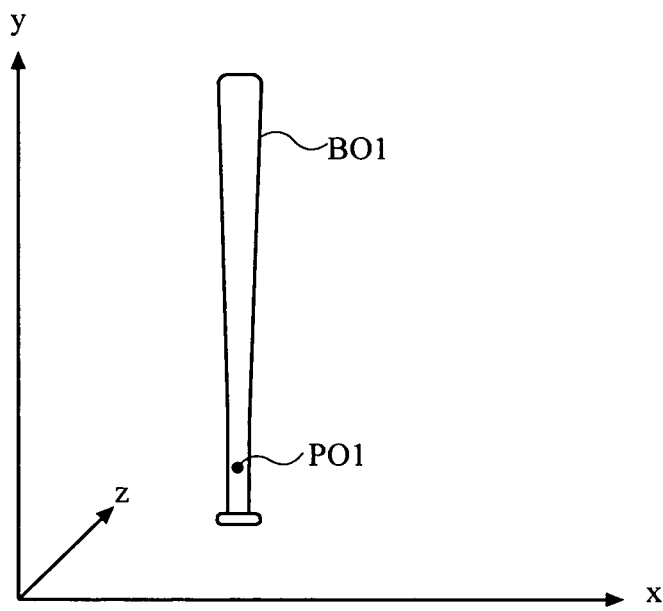
FIG. 19A shows an example of bat object BO1 displayed in an initial stage where the controller 7 stands still upright.
Figure 19B:
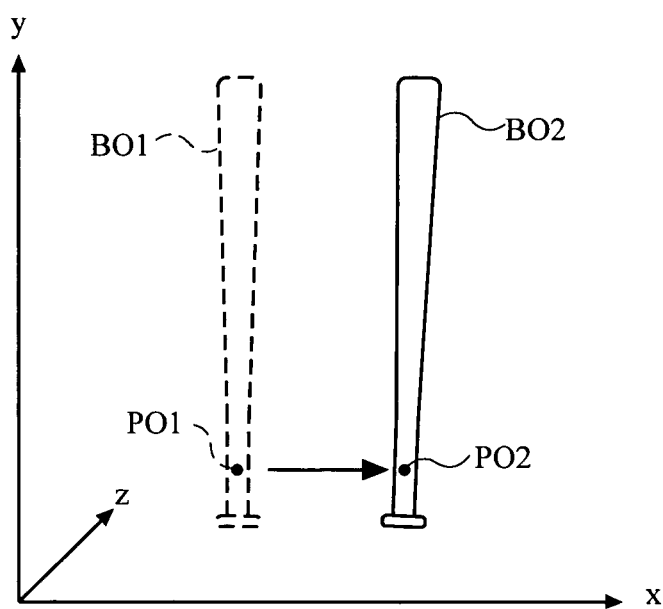
FIG. 19B shows an example of bat object BO2 displayed in a first stage of an operation of horizontally moving and inclining the controller 7.
Figure 19C:
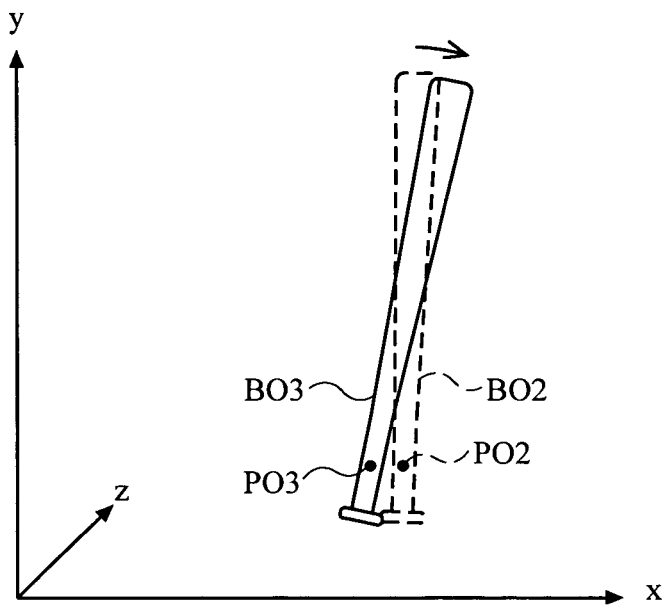
FIG. 19C shows an example of bat object BO3 displayed in a second stage of the operation of horizontally moving and inclining the controller 7.
Figure 19D:
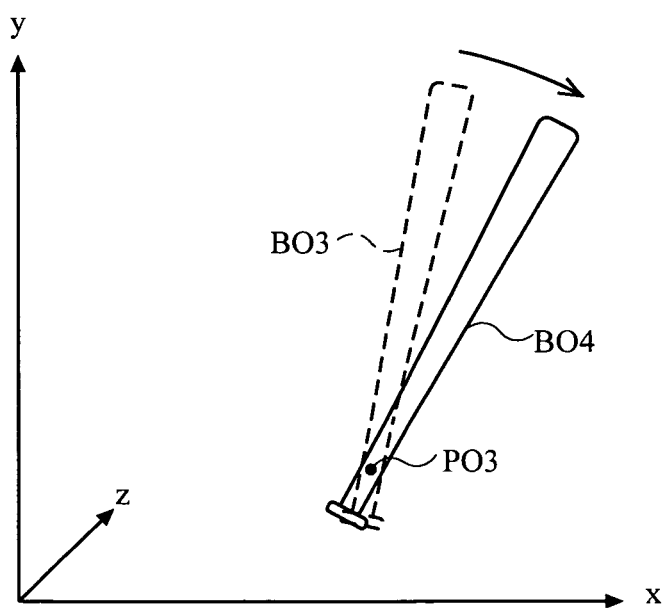
FIG. 19D shows an example of bat object BO4 displayed in a third stage of the operation of horizontally moving and inclining the controller 7.

Next, with reference to FIG. 19A through FIG. 19D, an example of display of the bat object BO in the upright state moving in the virtual game space and inclining will be described. FIG. 19A shows an example of bat object BO0 displayed in an initial stage where the controller 7 stands still upright. FIG. 19B shows an example of bat object BO2 displayed in a first stage of an operation of horizontally moving and inclining the controller 7. FIG. 19C shows an example of bat object BO3 displayed in a second stage of the operation of horizontally moving and inclining the controller 7. FIG. 19D shows an example of bat object BO4 displayed in a third stage of the operation of horizontally moving and inclining the controller 7. In FIG. 19A through FIG. 19D, only the bat object BO is shown for the sake of simplicity.

Similar to the case of FIG. 16, it is assumed that the controller 7 which is in the state of standing upright with the top surface directed in the negative Ys-axis direction and the front surface directed in the positive Zs-axis direction, is moved in the positive Ys-axis direction, is inclined in the in the positive Ys-axis direction, and is stopped still in the inclining state. As shown in FIG. 19A, when the controller 7 stands still upright, the bat object BO is displayed with the support position being set at the reference position (point PO1) and the inclination of the bat object BO being set at the reference inclination angle (the positive y-axis direction) (bat object BO1).

As shown in FIG. 19B, when the controller 7 is moved in the positive Ys-axis direction and an acceleration in the positive Y-axis direction is detected, the support position is immediately moved in the positive x-axis direction (point PO2) in accordance with the positive Y-axis direction acceleration. The bat object BO is inclined in the positive x-axis direction toward the inclination target which is set in accordance with the positive Y-axis direction acceleration by a predetermined ratio (e.g., 10%) (bat object BO2). The inclination of the bat object BO is made closer to the inclination target by the predetermined ratio, and does not immediately reach the inclination target.

As shown in FIG. 19C, when the controller 7, which has moved in the positive Ys-axis direction, is inclined in the positive Ys-axis direction and stopped, the moving acceleration in the positive Y-axis direction generated by the horizontal movement is 0 but an acceleration in the positive Y-axis direction is detected because of the gravitational acceleration. Since the magnitude of the positive Y-axis direction acceleration which is detected by the controller 7 is decreased, the support position is returned in the negative x-axis direction (point PO3). The bat object BO is gradually inclined toward the inclination target which is set in accordance with the positive Y-axis direction acceleration because of the gravitational acceleration, by the predetermined ratio (bat object BO3). In the state of FIG. 19C, the inclination target has been shifted from that in the state of FIG. 19B, but the bat object BO has not reached the inclination target. Therefore, the bat object BO keeps on inclining in the positive x-axis direction.

As shown in FIG. 19D, while the controller 7 is maintained in the inclining state, an acceleration in the positive Y-axis direction is detected because of the same gravitational acceleration as that of the state in FIG. 19C. Since the magnitude of the positive Y-axis direction acceleration which is detected by the controller 7 is not changed, the support position is not moved (point PO3). The bat object BO is further inclined in the positive x-axis direction by the predetermined ratio toward the inclination target which is set in accordance with the positive Y-axis direction acceleration because of the gravitational acceleration (bat object BO4). In this way, the support point is drawn as moving in immediate response to the change in the dynamic acceleration and the static acceleration which are detected by the movement of the controller 7. By contrast, the bat object BO reacts in a delayed manner to the change in the static acceleration detected by the inclination of the controller 7, so as to be gradually inclined. Thus, the bat object BO is gradually inclined.

In the above embodiment, one point is provided in a lower part of the bat object BO as the point PO which represents the position of the bat object BO. The inclination angle of the bat object BO is set by a directional vector having the point PO as the support position. The position and inclination angle of the bat object BO may be set in a different manner. For example, a plurality of points which represent the position of the bat object BO may be provided in the bat object BO, so as to set the position and inclination angle thereof. Specifically, a point PA is provided in an upper part of the bat object BO in addition to the point PO in the lower part of the bat object BO. The inclination of the bat object BO is defined by the coordinate set of the point PA in the virtual game space. In this case, the inclination change may be calculated in step 74 by using the shift in the point PA. Thus, the present invention is applicable to the case of defining the position and inclination of the object by the coordinate sets of two points.

As described above, when an input operation is made using an input device including an acceleration sensor 701, the game apparatus 3 can draw an object using only an output from the acceleration sensor 701. In addition, one end of the bat object BO (support position) can be immediately moved in accordance with the motion of the controller 7, whereas the other end is moved to gradually follow the inclination of the controller 7. For example, when an object such as an elongate member is drawn as being moved at one end thereof, the one end is immediately moved whereas the other end is moved in a delayed manner so as to gradually follow the movement of the one end. Thus, a realistic representation as if the elongate member was moved in the real space can be provided.

In the above game example, the baseball bat is processed using three-axial acceleration data which is output from the controller 7. The present invention is applicable to other types of games. For example, the present invention is applicable to a game in which the player character handles some type of object (specifically, an elongate object such as a sword, bamboo sword, or rod), or a game in which the object is moved in the virtual game space needless to say. In the above embodiment, the game apparatus 3 for determining the movement or inclination of the controller 7 is included in the game system 1. The present invention is applicable to an information processing apparatus such as a general personal computer, which is operated by an input device including an acceleration sensor. Various types of processing can be executed based on determination results on an input device. For example, an object displayed by the information processing apparatus may be moved in accordance with the determined motion or inclination of the input device.

In the above embodiment, the acceleration sensor 701 included in the controller 7 is a three-axial acceleration sensor for detecting and outputting an acceleration as a component of each of three axial directions perpendicular to one another. The present invention can be realized with an acceleration sensor for detecting and outputting an acceleration in each of at least two axial directions perpendicular to each other. For example, an acceleration sensor for detecting and outputting an acceleration component of each of two axial directions (X- and Y-axis directions) (see FIG. 3 and FIG. 4) of the three-dimensional space accommodating the controller 7 is usable. With such an acceleration sensor, the movement of the support position along the x-axis and z-axis directions and the inclination along the x-axis and z-axis directions can be determined. In this case, where the acceleration in the X-axis direction and the acceleration in the Y-axis direction are both 0, the controller 7 can be determined as standing upright. A centrifugal component generated by a swing obtained from the acceleration components in the X- and Y-axis directions may be used to determine that the swing has been started, although the start of the swing cannot be determined using the acceleration component in the Z-axis direction in this case. A different sensor from the acceleration sensor 701 may be used to determine that the swing has been started. Alternatively, a game rule that one of the operation buttons 72 should be pressed when the player swings the controller 7 may be provided, so that the start of the swing can be determined by such a button being pressed.

The present invention can still be realized with an acceleration sensor for detecting and outputting an acceleration in only one axial direction. For example, an acceleration sensor for detecting and outputting an acceleration component in the Y-axis direction (see FIG. 3 and FIG. 4) of the three-dimensional space accommodating the controller 7 is usable. With such an acceleration sensor, the movement of the support position along the x-axis direction and the inclination along the x-axis direction can be determined. In this case, where the detected acceleration in the Y-axis direction is 0, the controller 7 can be determined as standing upright. The bat object BO is moved and inclined in the x-axis direction in the virtual game space. For drawing the bat object BO as moving and inclining in one direction, an acceleration sensor for detecting an acceleration in one axial direction is usable.

In the above description, the controller 7 and the game apparatus 3 are connected to each other by wireless communication. Alternatively, the controller 7 and the game apparatus 3 may be electrically connected to each other via a cable. In this case, the cable connected to the controller 7 is connected to a connection terminal of the game apparatus 3.

In the above description, the receiving unit 6 connected to the connection terminal of the game apparatus 3 is used as receiving means for receiving transmission data which is wirelessly transmitted from the controller 7. Alternatively, the receiving means may be a receiving module built in the game apparatus 3. In this case, the transmission data received by the receiving module is output to the CPU 30 via a predetermined bus.

The shape of the controller 7, and the shape, number, position or the like of the operation section 72 provided in the controller 7 are merely exemplary, and may be altered without departing from the scope of the present invention. The position of the imaging information calculation section 74 in the controller 7 (the light incident opening of the imaging information calculation section 74) does not need to be on the front surface of the housing 71, and may be on another surface as long as light can enter from the outside of the housing 71.

A storage medium having a game program stored thereon and a game apparatus according to the present invention, when an input operation is made using an input device including an acceleration sensor, allow an object to be drawn in accordance with an inclination of the input device, and are useful for a device or a program for drawing an object in accordance with a motion of a game controller or the like.

While the invention has been described in detail, the foregoing description is in all aspects illustrative and not restrictive. It is understood that numerous other modifications and variations can be devised without departing from the scope of the invention.

What is claimed is:

1. A storage medium having stored thereon a game program executable by a computer of a game apparatus for moving an object located in a virtual game space and displaying the object on a display device, using an acceleration detected by an input device including an acceleration sensor for detecting an acceleration in at least one axial direction, the game program causing the computer to execute:

an acceleration obtaining step of obtaining acceleration data which is output from the acceleration sensor;

a support position calculation step of calculating a support position coordinate set which represents a position, in the virtual game space, of a support provided on the object, based on the acceleration data obtained in the acceleration obtaining step;

an input device inclination calculation step of calculating an inclination of the input device in a real space, based on the acceleration data obtained in the acceleration obtaining step;

an object inclination calculation step of calculating an inclination for an object at which the object is inclined in the virtual game space while the object is supported and with respect to the support, in accordance with the inclination of the input device calculated in the input device inclination calculation step; and a display control step of locating the object in the virtual game space and displaying the object on the display device, using the support position coordinate set calculated in the support position calculation step and the parameter representing the object inclination calculated in the object inclination calculation step.

2. A storage medium according to claim 1, wherein the game program causes the computer to further execute an inclination target setting step of setting an inclination target for the object in the virtual game space, in accordance with the inclination of the input device;
in the object inclination calculation step, an inclination obtained by inclining the object from the current object inclination toward the inclination target by a predetermined ratio in the virtual game space is calculated, as the inclination.

3. A storage medium according to claim 1, wherein:
the inclination is a directional vector representing a direction of the object inclination in the virtual game space; and
in the display control step, the object is located in the virtual game space and displayed on the display device, using the support position coordinate set and the directional vector.

4. A storage medium according to claim 1, wherein:
the inclination is determined from a position coordinate set representing a position, in the virtual game space, of a point on the object which is different from the support; and
in the display control step, the object is located in the virtual game space and displayed on the display device, using the support position coordinate set and the position coordinate set of the point on the object which is different from the support.

5. A storage medium according to claim 1, wherein the game program causes the computer to further execute a movable range setting step of setting a movable range in which the support of the object is movable in the virtual game space.

6. A storage medium according to claim 5, wherein in the support position calculation step, the support position coordinate set is calculated by scaling the acceleration represented by the acceleration data, obtained in the acceleration obtaining step, to the movable range, in the state where a maximum acceleration detectable by the acceleration sensor is associated with starting and termination ends of the movable range.

7. A storage medium according to claim 6, wherein:
the acceleration sensor detects an acceleration in each of three axial directions perpendicular to one another which are defined for the input device;
in the movable range setting step, the movable range is set as a plane in the virtual game space; and
in the support position calculation step, the support position coordinate set is calculated by scaling an acceleration in a first axial direction included in the three axial directions to a first direction in the movable range, and scaling an acceleration in a second axial direction included in the three axial directions to a second direction in the movable range perpendicular to the first direction.

8. A storage medium according to claim 2, wherein:
the acceleration sensor detects an acceleration in each of three axial directions perpendicular to one another which are defined for the input device; and
in the inclination target setting step, the inclination target is set by converting an inclination of a longer axis direction of the input device with respect to a vertical direction in the real space into an inclination of a longer axis direction of the object with respect to a vertical direction in the virtual game space.

9. A game apparatus for moving an object located in a virtual game space and displaying the object on a display device, using an acceleration detected by an input device including an acceleration sensor for detecting an acceleration in at least one axial direction, the game apparatus comprising a processing unit and a memory storage device, the memory storage device storing a game program executed by the processing unit to cause the game apparatus to:
obtain acceleration data which is output from the acceleration sensor;
calculate a support position coordinate set which represents a position, in the virtual game space, of a support provided on the object, based on the obtained acceleration data;
calculate an inclination of the input device in a real space, based on the obtained acceleration data;
calculate an inclination for an object at which the object is inclined in the virtual game space while the object is supported and with respect to the support, in accordance with the calculated inclination of the input device; and
locating the object in the virtual game space and displaying the object on the display device, using the calculated support position coordinate set and the parameter representing the calculated object inclination.

10. A game apparatus according to claim 9, wherein the game program further cause the game apparatus to set an inclination target for the object in the virtual game space, in accordance with the inclination of the input device;
wherein the calculation of the inclination of the input device includes inclining the object from the current object inclination toward the inclination target by a predetermined ratio in the virtual game space as inclination.

11. A game apparatus according to claim 9, wherein:
the calculated inclination is a directional vector representing a direction of the object inclination in the virtual game space; and
the locating of the object in the virtual game space and the display of the object on the display device uses the support position coordinate set and the directional vector.

12. A game apparatus according to claim 9, wherein:
the inclination is determined from a position coordinate set representing a position, in the virtual game space, of a point on the object which is different from the support; and
the location of the object in the virtual game space and the display of the object on the display device uses the support position coordinate set and the position coordinate set of the point on the object which is different from the support.

13. A game apparatus according to claim 9, further comprising setting a movable range in which the support of the object is movable in the virtual game space.

14. A game apparatus according to claim 13, wherein the calculated support position coordinate set includes scaling acceleration represented by the acceleration data to the movable range, such that a maximum acceleration is associated with starting and termination ends of the movable range.

15. A game apparatus according to claim 14, wherein:
the acceleration sensor detects an acceleration in each of three axial directions perpendicular to one another which are defined for the input device;
the movable range is set as a plane in the virtual game space; and
the support position calculation means calculates the support position coordinate set by scaling an acceleration in a first axial direction included in the three axial directions to a first direction in the movable range, and scaling an acceleration in a second axial direction included in the three axial directions to a second direction in the movable range perpendicular to the first direction.

16. A game apparatus according to claim 10, wherein:

the acceleration sensor detects an acceleration in each of three axial directions perpendicular to one another which are defined for the input device; and setting the inclination target by converting an inclination of a longer axis direction of the input device with respect to a vertical direction in the real space into an inclination of a longer axis direction of the object with respect to a vertical direction in the virtual game space.

* * * * *